United States Patent
Liesener

(10) Patent No.: US 10,066,974 B2
(45) Date of Patent: Sep. 4, 2018

(54) INTERFEROMETRIC ENCODER SYSTEMS HAVING AT LEAST PARTIALLY OVERLAPPING DIFFRACTED BEAMS

(71) Applicant: Zygo Corporation, Middlefield, CT (US)

(72) Inventor: Jan Liesener, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 183 days.

(21) Appl. No.: 14/880,812

(22) Filed: Oct. 12, 2015

(65) Prior Publication Data

US 2016/0102999 A1    Apr. 14, 2016

Related U.S. Application Data

(60) Provisional application No. 62/063,261, filed on Oct. 13, 2014.

(51) Int. Cl.
*G01B 11/02*    (2006.01)
*G01D 5/38*    (2006.01)

(52) U.S. Cl.
CPC ..................... *G01D 5/38* (2013.01)

(58) Field of Classification Search
CPC ................. G01D 5/347; G01D 5/38
See application file for complete search history.

(56) References Cited

U.S. PATENT DOCUMENTS

| | | | |
|---|---|---|---|
| 5,483,343 A | 1/1996 | Iwamoto et al. | |
| 8,300,233 B2 | 10/2012 | Deck et al. | |
| 8,829,420 B2 | 9/2014 | Goodwin et al. | |
| 2008/0062431 A1 | 3/2008 | Goldman | |
| 2008/0062432 A1 | 3/2008 | Sandig et al. | |
| 2009/0268210 A1 | 10/2009 | Prince | |

(Continued)

FOREIGN PATENT DOCUMENTS

| | | | |
|---|---|---|---|
| DE | 102006042743 | 3/2008 | ............. G01B 11/00 |
| TW | 201303264 | 1/2013 | ............... G01B 9/02 |

(Continued)

OTHER PUBLICATIONS

US 9,152,061, 10/2015, Liesener (withdrawn)

(Continued)

*Primary Examiner* — Hwa Lee
(74) *Attorney, Agent, or Firm* — Fish & Richardson P.C.

(57) ABSTRACT

An encoder interferometry system includes an encoder scale arranged to receive and diffract a measurement beam. The system further includes one or more optical elements configured and arranged to receive a first diffracted measurement beam and a second diffracted measurement beam from the encoder scale and to redirect the first diffracted measurement beam and the second diffracted measurement beam toward the encoder scale such that the first diffracted measurement beam and the second diffracted measurement beam propagate along non-parallel beam paths having an angular separation α following a second diffraction at the encoder scale. The system further includes a first detector arranged to receive the first diffracted measurement beam and a second detector arranged to receive the second diffracted measurement beam.

38 Claims, 16 Drawing Sheets

(56) References Cited

U.S. PATENT DOCUMENTS

| | | | |
|---|---|---|---|
| 2011/0310396 A1* | 12/2011 | Tamiya | G01D 5/38 |
| | | | 356/498 |
| 2012/0194824 A1 | 8/2012 | de Groot et al. | |
| 2013/0114061 A1 | 5/2013 | de Groot et al. | |
| 2013/0114062 A1 | 5/2013 | Liesener | |
| 2013/0278914 A1 | 10/2013 | Demarest | |
| 2014/0049782 A1 | 2/2014 | Deck et al. | |
| 2014/0183345 A1 | 7/2014 | Goodwin | |

FOREIGN PATENT DOCUMENTS

| | | | | |
|---|---|---|---|---|
| TW | 201333432 | 8/2013 | ............... | G01B 5/38 |
| TW | 201344158 | 11/2013 | ............. | G01D 5/244 |
| WO | WO 2013/070957 | 5/2013 | ............... | G01D 5/26 |

OTHER PUBLICATIONS

Taiwan Office Action for Taiwan Application No. 104133473 dated Jul. 20, 2016 (7 pages).
International Preliminary Report on Patentability and Written Opinion of the International Searching Authority dated Apr. 27, 2017.
Badami, V., and de Groot, P. "Displacement Measuring Interferometry," [Handbook of Optical Dimensional Metrology], K. G. Harding, Ed., Taylor & Francis, Boca Raton (2013).
International Search Report and Written Opinion of the International Searching Authority for International Application No. PCT/US2015/055133 dated Jan. 21, 2016 (11 pages).
Supplementary European Search Report for European Application No. EP 15 84 9836 dated Apr. 16, 2018 (3 pages).
European Patent Office Communication for European Patent Application No. 15 849 836.0 dated May 29, 2018 (6 pages).

* cited by examiner

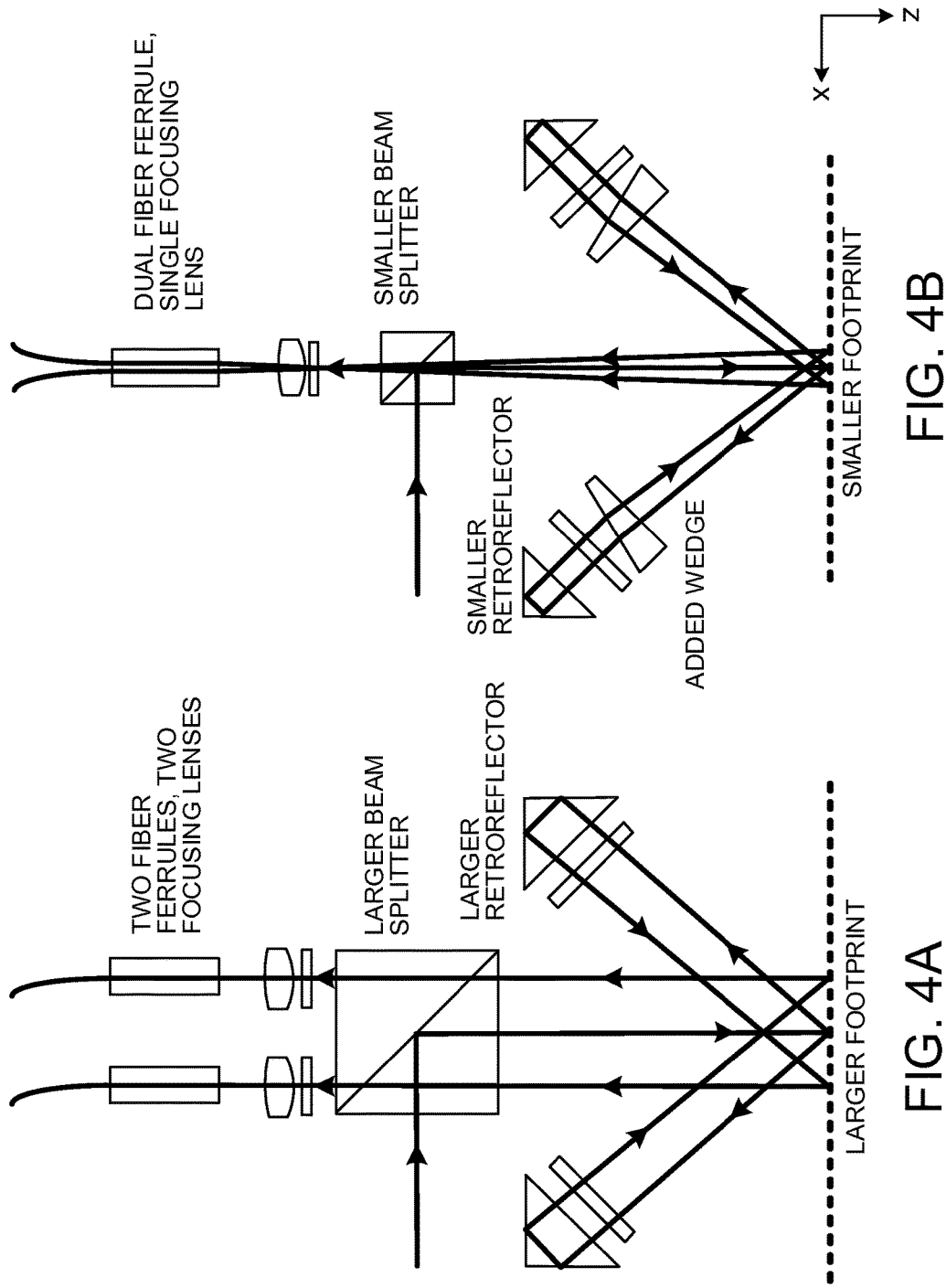

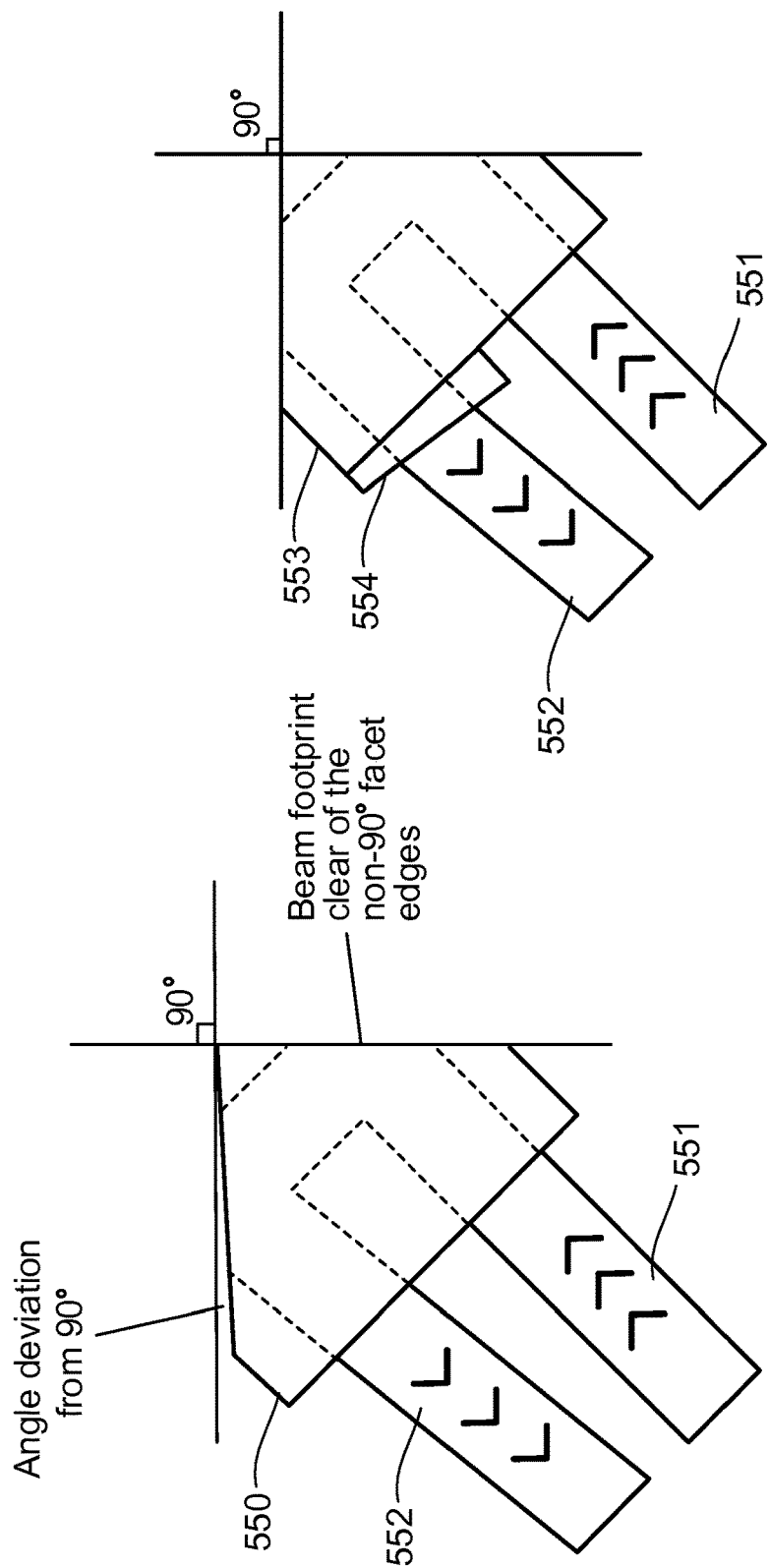

LOCAL REFERENCE PICKOFF
REFLECTIVE
TRANSMISSIVE
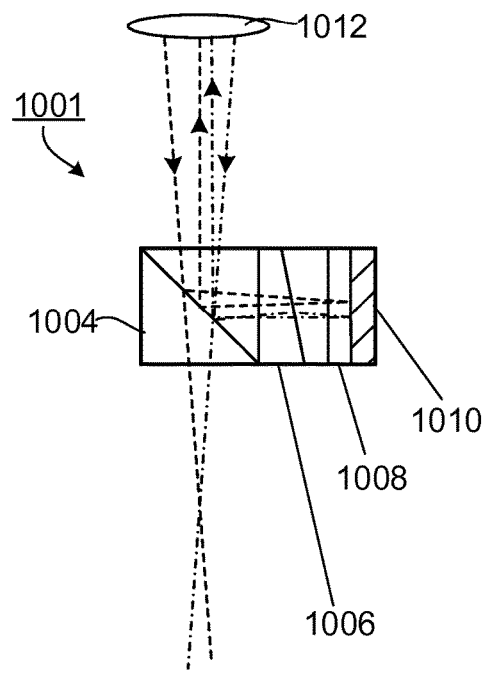
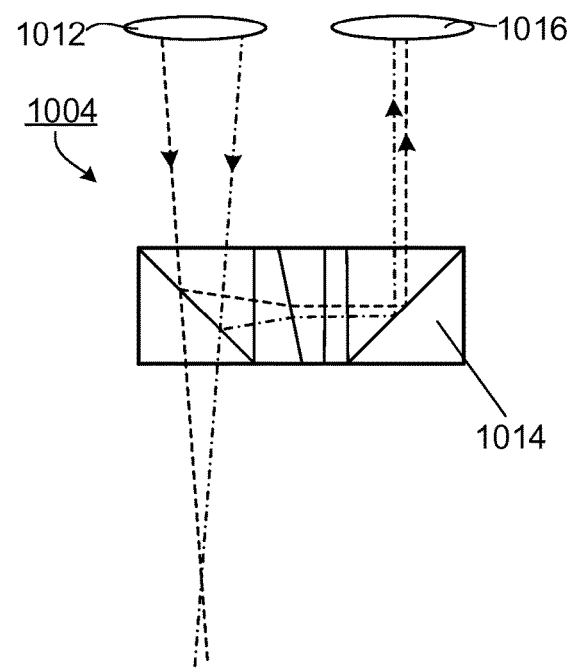
FIG. 10A
FIG. 10B

INTERFEROMETRIC ENCODER SYSTEMS HAVING AT LEAST PARTIALLY OVERLAPPING DIFFRACTED BEAMS

CROSS-REFERENCE TO RELATED APPLICATIONS

This application claims the benefit of U.S. provisional application No. 62/063,261, filed Oct. 13, 2014, the contents of which are incorporated by reference herein in their entirety.

TECHNICAL FIELD

This disclosure relates to interferometric encoder systems.

BACKGROUND

Interferometric encoders can perform high precision measurements of the position of mechanical stages with respect to a reference frame. For this purpose, an encoder head is mounted to the stage and a periodic grating structure (e.g., an encoder scale) is mounted to the reference frame, or vice versa. Compared to free-space distance-measuring interferometers, this can have the advantage of significantly shortened paths in air and thereby reducing the impact of air turbulence. Often, stage motion has to be monitored in multiple dimensions, thereby requiring multiple measurement beams that typically use different diffraction orders of the grating.

In applications of interferometric encoders where space is very limited and stages are accelerated at several tens of m/s$^2$ (e.g., in photolithography steppers), there is an incentive to keeping components of the metrology solution as compact and light weight as possible. With regards to the encoder head, one way to reduce size and weight is to choose a small beam size and thereby enable a scaled-down version of the same encoder head. Consequently, however, the encoder's sensitivity to small scale grating errors is increased since the averaging effect over the beam size is reduced. Furthermore, this approach may, depending on the beam geometry, limit the measurement range along the grating normal over which the encoder can maintain a strong interference signal (e.g., measurement beams may shear and lose overlap with the reference beam).

SUMMARY

The present disclosure is directed to enabling a reduction in the size and weight of interferometric encoders. The techniques disclosed herein entail routing the beams of the interferometric encoder in such a way that minimizes the required space on the encoder scale (e.g., minimizes the beam footprint) and/or in a way that enables the use of glass components for multiple measurement beams, without requiring a reduction in beam size. In particular, compact encoder configurations are possible by allowing the footprints of multiple measurement beams to overlap on the encoder scale and propagate through the same volume of glass in the encoder head before the first and after the last diffraction off the encoder scale. As an enabling measure, the encoder head optics are designed to provide a slight angular separation between the beams so that a single focusing lens can direct the beams to separate detectors.

In general, in a first aspect, the subject matter of the present disclosure encompasses an encoder interferometry system that includes multiple optical components configured and arranged to direct a measurement beam to an encoder scale to produce multiple twice-diffracted measurement beams, in which two of the multiple twice-diffracted measurement beams propagate along non-parallel beam paths having an angular separation $\alpha$, and the non-parallel beam paths of the two twice-diffracted beams at least partially overlap; a first detector arranged to receive one of the two twice-diffracted measurement beams and a first reference beam; a second detector arranged to receive the other of the two twice-diffracted measurement beams and a second reference beam; and an electronic processor configured to receive an interference signal from each of the first and second detectors, each interference signal including a phase related to the relative displacement between the encoder scale and the encoder head, and to determine information about a degree of freedom of the encoder head or the encoder scale based on the phase for each interference signal.

Embodiments can include one or more of the following features. For example, in some embodiments, the multiple optical components include: a first retroreflector, a first waveplate, and a first birefringent wedge prism arranged to receive a first once-diffracted measurement beam from the encoder scale and redirect the first once diffracted measurement beam back to the encoder scale; a second retroreflector, a second waveplate, and a second birefringent wedge prism arranged to receive a second once-diffracted measurement beam from the encoder scale and redirect the second once diffracted measurement beam back to the encoder scale.

In some embodiments, the multiple optical components include: a first retroreflector and a first wedge prism, the first wedge prism being arranged to receive a single pass of a first once-diffracted measurement beam; and a second retroreflector and a second wedge prism, the second wedge prism being arranged to receive a single pass of a second once-diffracted measurement beam.

In some embodiments, the encoder interferometry system further includes: a focusing lens positioned to receive the first twice-diffracted measurement beam and the second twice-diffracted measurement beam; and an arrangement including a first optical fiber and a second optical fiber, the first optical fiber being positioned to receive one of the two twice-diffracted measurement beams and the first reference beam, and the second optical fiber being positioned to receive the other of the two twice-diffracted measurement beams and the second reference beam, in which an entrance face of the first optical fiber is separated from an entrance face of the second optical fiber by a distance D, in which $D=(\alpha)(f)$, and f is a focal length of the focusing lens.

In some embodiments, the multiple optical components are configured and arranged to: receive a first once-diffracted measurement beam from the encoder scale; receive a second once-diffracted measurement beam from the encoder scale; and redirect the first and second once-diffracted measurement beams to substantially the same area on the encoder scale. Substantially the same area can include, e.g., a separation between the beams of less than a beam radius.

In some embodiments, the first once-diffracted measurement beam includes a positive first order diffracted beam and the second once-diffracted measurement beam includes a negative first order diffracted beam.

In some embodiments, the multiple optical components include: a first reflector element having at least two reflecting facets arranged to receive redirect a first once-diffracted measurement beam to the encoder scale, in which an angle between the at least two reflecting facets of the first reflector is greater than or less than 90 degrees, a second reflector element having at least two reflecting facets arranged to receive and redirect a second once-diffracted measurement beam to the encoder scale, in which an angle between the at least two reflecting facets of the second reflector is greater than or less than 90 degrees.

In some embodiments, the encoder interferometry system further includes: the encoder scale; and a moveable stage, in which the encoder scale or the encoder head is attached to the moveable stage.

In some embodiments, the multiple optical components include a beam splitting element configured and arranged to: receive the first reference beam and the second reference beam; and combine the first reference beam and the second reference beam with the one of the two twice-diffracted measurement beam and the other of the two twice-diffracted measurement beam to form a first output beam and a second output beam, respectively.

In some embodiments, the multiple optical components are further configured and arranged to direct a second beam to the encoder scale to produce multiple twice-diffracted second beams, the twice-diffracted second beams including the first reference beam and the second reference beam, in which the first reference beam and the second reference beam propagate along non-parallel beam paths having the angular separation $\alpha$, and the non-parallel beam paths of the first reference beam and the second reference beam at least partially overlap.

In some embodiments, the multiple optical components include multiple reference optical components, the reference optical components being configured and arranged to: receive a second beam; produce, from the second beam, the first reference beam and the second reference beam, in which the first reference beam and the second reference beam propagate along non-parallel beam paths having the angular separation $\alpha$. The multiple reference optical components can include a diffraction grating. The multiple reference optical components can include: a beam-splitting component, a first reflecting surface and a second reflecting surface, in which the beam splitting component is arranged to split the second beam into the first reference beam and the second reference beam, to direct the first reference beam to the first reflecting surface, to direct the second reference beam to the second reflecting surface, and to receive and combine the first and second reference beams after reflection from the first and second reflecting surfaces, respectively, in which a plane of the first reflecting surface facing a first side of the beam splitting component is non-parallel with the first side of the beam splitting component, and a plane of the second reflecting surface facing a second side of the beam splitting component is non-parallel with the second side of the beam splitting component. The multiple reference optical components can include a first quarter-wave polarizer arranged to receive the second beam, a second quarter-wave polarizer, a birefringent wedge component between the first and second quarter-wave polarizers, and a retro-reflector arranged to: receive the first reference beam and the second reference beam from the second quarter-wave polarizer; and redirect the first reference beam and the second reference beam to the second quarter-wave polarizer. The multiple reference optical components can include: a retro-reflector; and a diffraction grating, in which the retro-reflector is arranged to receive the second beam and redirect the second beam to the diffraction grating, and in which the diffraction grating is arranged to produce the first and second reference beams from the second beam received from the retro-reflector. The multiple reference optical components can include a reflecting surface and wedge prism, in which the reflecting surface is arranged to receive the second beam and redirect the second beam to the wedge prism, and in which the wedge prism is arranged to receive the second beam from the reflecting surface to produce the first and second reference beams.

The multiple reference optical components can include: a retro-reflector arranged to receive and redirect the second beam; a polarizing element arranged to receive the redirected second beam from the retro-reflector; and a birefringent wedge prism pair arranged to receive the second beam from the polarizing element and to produce the first and second reference beams.

In general, in another aspect, the subject matter of the present disclosure can encompass an encoder interferometry system including: an encoder head, the encoder head being configured to direct light to an encoder scale to produce multiple twice-diffracted measurement beams, in which the encoder head includes a single optical element arranged to receive an input beam from a light source, in which the optical element is configured to direct a first portion of the input beam along a measurement path to define a measurement beam, in which the optical element is further configured and arranged to receive a first once-diffracted measurement beam and a second once-diffracted measurement beam from the encoder scale and to redirect the first once-diffracted measurement beam and the second once-diffracted measurement beam toward the encoder scale to produce a first twice-diffracted measurement beam and a second twice-diffracted measurement beam such that the first twice-diffracted measurement beam and the second twice-diffracted measurement beam propagate along non-parallel beam paths having an angular separation $\alpha$ through the optical element following the second diffraction at the encoder scale, and the non-parallel beam paths of the first and second twice-diffracted beams at least partially overlap; a first detector arranged to receive the first twice-diffracted measurement beam and a first reference beam; a second detector arranged to receive the second twice-diffracted measurement beam and a second reference beam; and an electronic processor configured to receive an interference signal from each of the first and second detectors, each interference signal including a phase related to the relative displacement between the encoder scale and the encoder head, and to determine information about a degree of freedom of the encoder head or the encoder scale based on the phase for each interference signal.

Embodiments can include one or more of the following features. For example, in some embodiments, the single optical element includes: at least two reflecting facets arranged to redirect the first once-diffracted measurement beam, in which an angle between the at least two reflecting facets that are arranged to redirect the first once-diffracted measurement beam is greater than or less than 90 degrees; and at least two reflecting facets arranged to redirect the second once-diffracted measurement beam toward the encoder scale, in which an angle between the at least two reflecting facets that are arranged to redirect the second once-diffracted measurement beam toward the encoder scale is greater than or less than 90 degrees.

In some embodiments, the system further includes: a focusing lens positioned to receive the first twice-diffracted measurement beam and the second twice-diffracted measurement beam from the single optical element; and an arrangement including a first optical fiber and a second optical fiber, the first optical fiber being positioned to receive the first twice-diffracted measurement beam and the second optical fiber being positioned to receive the second twice-diffracted measurement beam, in which an entrance face of the first optical fiber is separated from an entrance face of the second optical fiber by distance D, in which D=(α)(f), and f is a focal length of the focusing lens.

In some embodiments, the single optical element is configured and arranged to redirect the first once-diffracted measurement beam and the second once-diffracted measurement beam to substantially the same area on the encoder scale. Substantially the same area can include, e.g., a separation between the beams of less than a beam radius.

In some embodiments, the first once-diffracted measurement beam includes a positive first order diffracted beam and the second once-diffracted measurement beam includes a negative first order diffracted beam.

In some embodiments, the system further includes: the encoder scale; and a moveable stage, in which the encoder scale or the encoder head is attached to the moveable stage.

In some embodiments, the system further includes the encoder scale; a moveable stage, in which either the encoder system or the encoder scale is attached to the moveable stage; an illumination system including a radiation source, in which during operation of the lithography system, the radiation source directs radiation to an object supported by the moveable stage; and a positioning system coupled to the electronic processor of the encoder interferometry system and configured to adjust a position of the stage based on the information about the degree of freedom.

In general, in another aspect, the subject matter of the present disclosure can encompass methods including: directing, from an encoder head, a portion of an input beam to an encoder scale, in which the portion of the input beam is diffracted by the encoder scale into a first once-diffracted measurement beam and a second once-diffracted measurement beam; receiving at the encoder head the first once-diffracted measurement beam and the second once-diffracted measurement beam following diffraction from the encoder scale; redirecting, from the encoder head, the first once-diffracted measurement beam and the second once-diffracted measurement beam back toward the encoder scale to produce a first twice-diffracted measurement beam and a second twice-diffracted measurement beam, such that the first twice-diffracted measurement beam and the second twice-diffracted measurement beam propagate along non-parallel beam paths having an angular separation α through the encoder head, and the non-parallel beam paths of the two twice-diffracted beams at least partially overlap; receiving, at a first detector, a first output beam including the first twice-diffracted measurement beam and a first reference beam to produce a first interference signal; receiving, at a second detector, a second output beam including the second twice-diffracted measurement beam and a second reference beam to produce a second interference signal, in which each interference signal includes a phase related to the relative displacement between the encoder scale and the encoder head; receiving, at an electronic processor, the first and second interference signals; and determining, by the electronic processor, information about a degree of freedom of the encoder scale or the encoder head based on the phase for each interference signal.

Embodiments can include one or more of the following features. For example, in some embodiments, the methods further include passing the first output beam and the second output beam through a lens of focal length f; receiving, from the lens, the first output beam and the second output beam at a first optical fiber and at a second optical fiber, respectively, in which a spatial separation D of the first output beam at an entrance face of the first optical fiber from the second output beam at an entrance face of the second fiber is defined as D=(α)(f); and passing the first output beam and the second output beam from the first optical fiber and the second optical fiber to the first detector and the second detector, respectively.

In some embodiments, redirecting the first once-diffracted measurement beam and the second once-diffracted measurement beam back to the encoder scale includes redirecting the first once-diffracted measurement beam and the second once-diffracted measurement beam to substantially the same area on the encoder scale. Substantially the same area can include, e.g., a separation between the beams of less than a beam radius.

In some embodiments, redirecting the first once-diffracted measurement beam and the second once-diffracted measurement beam back to the encoder scale includes: passing the first once-diffracted measurement beam through a first waveplate and a first birefringent wedge prism to a first retroreflector; redirecting the first once-diffracted measurement beam back through the first waveplate and the first birefringent wedge prism; passing the second once-diffracted measurement beam through a second waveplate and a second birefringent wedge prism to a second retroreflector; and redirecting the second once-diffracted measurement beam back through the second waveplate and the second birefringent wedge prism.

In some embodiments, redirecting the first once-diffracted measurement beam and the second once-diffracted measurement beam back to the encoder scale includes: passing the first once-diffracted measurement beam to a first retroreflector; passing the first once-diffracted measurement beam through a first wedge prism once either before or after the first once-diffracted measurement beam reaches the first retroreflector; passing the second once-diffracted measurement beam through a second retroreflector; and passing the second once-diffracted measurement beam through a second wedge prism once either before or after the second once-diffracted measurement beam reaches the second retroreflector.

In some embodiments, redirecting the first once-diffracted measurement beam and the second once-diffracted measurement beam back to the encoder scale includes: passing the first once-diffracted measurement beam to a first corner cube reflector including three reflecting facets, in which an angle between at least two of the adjacent reflecting facets of the first corner cube reflector is greater than or less than 90 degrees; and passing the second once-diffracted measurement beam to a second corner cube reflector including three reflecting facets, in which an angle between at least two of the adjacent reflecting facets of the second corner cube reflector is greater than or less than 90 degrees.

In some embodiments, the encoder head includes a monolithic optical element having multiple reflecting facets, and in which an angle between adjacent reflecting facets of the monolithic optical element is greater than or less than 90 degrees.

In some embodiments, the first once-diffracted measurement beam includes a positive first order diffracted beam and the second once-diffracted measurement beam includes a negative first order diffracted beam.

In some embodiments, the method further includes combining, in the encoder head, the first twice-diffracted measurement beam and the second twice-diffracted measurement beam, following the second diffraction, with a third diffracted measurement beam and a fourth diffracted measurement beam to produce the first output beam and the second output beam, respectively, in which the third diffracted measurement beam and the fourth diffracted measurement beam have the same angle of separation as between the first twice-diffracted measurement beam and the second twice-diffracted measurement beam, and in which the third diffracted measurement beam and the fourth diffracted measurement beam are derived from the input beam.

In general, in another aspect, the subject matter of the present disclosure can encompass encoder interferometry systems including: an encoder head including: multiple optical elements arranged and configured to direct a first measurement beam and a second measurement beam toward an encoder scale to produce a first once-diffracted measurement beam and a second once-diffracted measurement beam, receive the first once-diffracted measurement beam and the second once-diffracted measurement beam from the encoder scale, redirect the first once-diffracted measurement beam and the second once-diffracted measurement beam toward the encoder scale to produce a first twice-diffracted measurement beam and a second twice-diffracted measurement beam such that the first twice-diffracted measurement beam and the second twice-diffracted measurement beam propagate along non-parallel beam paths having an angular separation $\alpha$ following the second diffraction at the encoder scale, in which the non-parallel beam paths at least partially overlap, and combine the first twice-diffracted measurement beam and the second twice-diffracted measurement beam with a third beam and a fourth beam, respectively, in which the third beam and the fourth beam have the same angular separation $\alpha$ such that the first twice-diffracted measurement beam and the third beam propagate along a first co-linear path and so that the second twice-diffracted measurement beam and the fourth beam propagate along a second co-linear path; a first detector arranged to receive the first twice-diffracted measurement beam and the third beam; a second detector arranged to receive the second twice-diffracted measurement beam and the fourth beam; and an electronic processor configured to receive an interference signal from each of the first and second detectors, each interference signal including a phase related to the relative displacement between the encoder scale and the encoder head, and to determine information about a degree of freedom of the encoder head or the encoder scale based on the phase for each interference signal.

Embodiments can include one or more of the following features. For example, in some embodiments, the multiple optical components include: at least one retro-reflector element; at least one waveplate; at least one optical wedge element, in which at least one of the waveplates and at least one of the optical wedge elements are arranged in a corresponding waveplate-wedge pair that is positioned in a beam path of the first once-diffracted measurement beam.

In some embodiments, the system includes two retro-reflector elements and a second waveplate-wedge pair, in which the first retro-reflector element is positioned to receive the first once-diffracted measurement beam from the first waveplate-wedge pair and/or redirect the first once-diffracted measurement beam to the first waveplate-wedge pair, and the second retro-reflector element is positioned to receive the second once-diffracted measurement beam from the second waveplate-wedge pair and/or redirect the second once-diffracted measurement beam to the second waveplate-wedge pair.

In some embodiments, the system includes a single retro-reflector element and at least two waveplate-wedge pairs, in which the single retro-reflector element is a cuboid shaped optical element having multiple retro-reflecting corners, and in which the cuboid shaped optical element is positioned to: receive, from the first waveplate-wedge pair, the first once-diffracted measurement beam at a first retro-reflecting corner, redirect the first once-diffracted measurement beam back to the first waveplate-wedge pair, receive, from the second waveplate-wedge pair, the second once-diffracted measurement beam at a second retro-reflecting corner, and redirect the second once-diffracted measurement beam back to the second waveplate-wedge pair.

In some embodiments, the system includes the encoder scale.

In some embodiments, the system includes: three retro-reflector elements; two non-birefringent wedge elements; a birefringent wedge element; and two waveplates, in which a first non-birefringent wedge element is positioned at an input or output face of a first retro-reflector element, a second non-birefringent wedge element and a first waveplate are positioned at an input or output face of a second retro-reflector element, and the birefringent wedge element and a second waveplate are positioned at an input or output face of a third retro-reflector element, in which the first and the second retro-reflector elements are arranged across from one another such that the first and second retro-reflector elements receive, from the encoder scale, the first once-diffracted measurement beam and the second once-diffracted measurement beam, respectively, a beam path of the first once-diffracted measurement beam and a beam path of the second once-diffracted measurement beam are in the same first plane, and in which the third retro-reflector element is arranged to receive, from the encoder scale, a third once-diffracted measurement beam that propagates along a beam path that is in a second plane oriented orthogonal to the first plane, the birefringent wedge element and a second waveplate being arranged to split the third once-diffracted measurement beam into two separate beams that, following diffraction from the encoder scale, correspond to the third and fourth beam.

Various optical component designs may be used to accomplish the slight angular separation between the measurement beams including, for example, quasi retro-reflecting components that either have a designed-in non-90° angle between facets and, optionally, an additional wedge prism that may be birefringent or not. The term "optical component" as used herein, also sometimes referred to as "optical element," may, in certain implementations, be understood to include a component or element in an optical instrument, such as a lens, prism, or mirror, that affects light traveling through the instrument.

Advantages of the systems and methods disclosed herein include, for example, a reduction in the weight and space used by interferometric encoders. The reduction in weight and space requirements may be due to one or more factors such as an increase in the number of optical components that can be shared between multiple measurement beams, a reduction in size of one or more optical components, the use of a fiber coupling assembly requiring only a single lens to couple into multiple fibers, the use of a smaller beam splitter for separating and recombining measurement and reference beams since the volume of the beam splitter is shared among multiple beams, and/or the use of a smaller encoder scale due to the smaller combined beam footprint. Another advantage of the systems and methods disclosed herein is a reduction in cost requirements which may also be attributed to one or more of the factors indicated above. Another advantage is that, in some implementations, measurement error from some parasitic beam paths can be avoided. Another advantage is that, in some implementations, the impact of encoder scale substrate errors on lateral position measurements can be cancelled if the footprints of the channels using the positive and negative diffraction orders are identical. Another advantage is that, in some implementations, the impact of holographic encoder scale errors on position measurements normal to the surface can be canceled if footprints of channels using the positive and negative diffraction orders are identical. Another advantage is that, in some implementations, there is reduced drift for measurements that involve calculation of interference phase differentials between channels (e.g., for detection of motion in the plane of the grating) due to common path characteristics.

The details of one or more embodiments are set forth in the accompanying drawings and the description below. Other features and advantages will be apparent from the description, the drawings, and the claims.

BRIEF DESCRIPTION OF THE DRAWINGS

FIGS. 4A and 4B are schematic diagrams of an interferometric optical encoder system.

FIG. 5B is a schematic that illustrates a two-dimensional side view of an imperfect retro-reflector.

FIG. 5C is a schematic that illustrates a two-dimensional side view of a retro-reflector and wedge prism.

FIGS. 10A-10B are schematics that illustrate possible locations a for local reference interferometer relative to the collimator/coupling optics.

DETAILED DESCRIPTION

Figure 1:
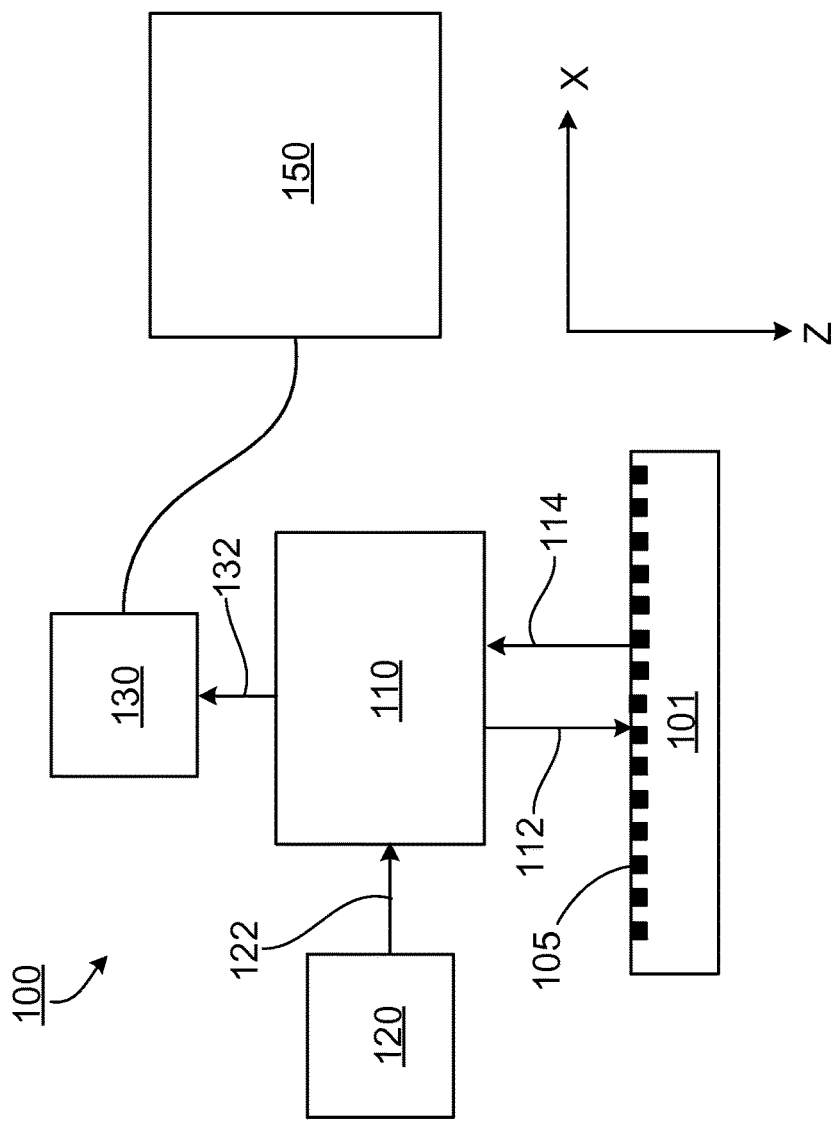
FIG. 1 is a schematic diagram of an embodiment of an interferometric optical encoder system.

Optical interferometry is used to make precise measurements in a variety of settings. For example, semiconductor lithography systems use laser interferometry to measure displacements and accurately position stages to nanometer precision. In these systems a laser beam aligned to the cavity motion is reflected off a mirror attached to the moving object and is interfered with another beam that serves as a reference. The interference phase changes by $2\pi$ each time the beam path changes by a wavelength, so the interference phase provides a measurement of changes in the cavity length. Heterodyne or homodyne techniques are routinely used to extract the phase of the interference. Often in these systems the measurement light beam travels long distances in air. If the refractive index of the air in the beam path changes, even locally, the change manifests itself as an apparent displacement. This apparent displacement constitutes a measurement error and the longer the air path, the more serious this error is likely to be.

A class of displacement measurement interferometers with significantly shorter air paths is interferometric encoders. Encoders measure displacement that is transverse to the measurement beam by determining the phase shift of a beam reflected off of a periodic structure, typically a grating. As the patterned surface moves under the beam, the phase of the laser beam shifts by $2\pi$ during each pattern period. High precision measurements of the beam phase (or of the phase of an interference beam derived in part from the measurement beam) then allow displacement measurements to small fractions of a pattern period. The fact that the measured motion is transverse to the beam allows a significant reduction in the cavity length and hence the beam air path, thereby minimizing atmospheric refractive index fluctuations. Further details regarding basic interferometric encoder design can be found, for example, in U.S. Pat. No. 8,300,233 ("Interferometric Encoder Systems") to Deck et al., the subject matter of which is incorporated herein by reference in its entirety.

Interferometric encoders can be designed to be desensitized to grating tilt. This is achieved by double pass geometries, where the tilt transferred to the beam at the first diffraction event is compensated at the second diffraction event. A detailed discussion of such systems can be found, for example, in U.S. Patent App. Pub. No. 2013/0114061 ("Double pass interferometric encoder system") to de Groot et al., the subject matter of which is incorporated herein by reference in its entirety. The double pass geometries also increase the sensitivity to grating motion since each of the two diffraction events shifts the phase of the measurement beam by $2\pi$ per grating period. Between the diffraction events, some type of reflection optics is required to redirect the beams toward the grating. Often, this involves retroreflectors, sometimes combined with additional beam splitters and/or refractive or diffractive beam steering components. Having a retro-reflector in the beam path can provide a convenient way to achieve that the beams return in a direction that is exactly opposite to the direction of the input beam. If applied to measurement and reference beams, this assures codirectionality and therefore good interference contrast after recombination of the beams.

Some optical encoders use multiple measurement beams to probe the grating, where each measurement beam corresponds to a different diffraction order of the grating. Each returning diffracted measurement beam is interfered with an associated reference beam or another measurement beam and the interference phase is detected for each interfering measurement beam-reference beam pair (i.e., for each "channel"). By combining the multiple resulting interference phases in various ways, motion in various directions can be distinguished, e.g. motion in the plane of the grating versus motion normal to the grating. In order to avoid pollution of one measurement beam with light originating from another measurement beam, typical multiple beam encoder designs keep beams physically separated by some safe margin. Keeping the measurement beams at such distances may hinder or preclude reducing the system weight and volume.

The techniques described herein remove the requirement to provide substantial spacing between the multiple returning diffracted measurement beams. This is done by providing an intentional angle difference between the returning beams. The separation angle is chosen small enough so that the beams can nominally travel commonly through one or more optical components of the encoder head and large enough so that the beams can be directed to separate detectors in a way that interference phases are not polluted by the respective other channels. For maximum compactness and radiometric efficiency, the input for the multiple channels can be a single beam that is split into multiple beams by means of diffraction (e.g. into +1 and −1 orders of a 1D grating or into orders (+1,0), (−1,0), (0,+1) and (0,−1) for a 2D grating). In some cases, the input beam and all returning beams share the same nominal footprint on the grating.

Interferometric Heterodyne Optical Encoder Systems

Before describing the interferometric encoder implementations that introduce the angle of separation between returning diffracted measurement beams, it is helpful to first review the operation of a typical interferometric encoder. Referring to FIG. 1, an example of an interferometric heterodyne optical encoder system 100 includes a light source module 120, an optical assembly 110, a measurement object 101, a detector module 130 (e.g., including a polarizer and a detector), and an electronic processor 150. Generally, light source module 120 includes a light source (e.g., including a laser) and can also include other components such as beam shaping optics (e.g., lenses and light collimating optics), light guiding components (e.g., fiber optic waveguides) and/or polarization management optics (e.g., polarizers and/or wave plates). The optical assembly is also referred to as the "encoder head." A Cartesian coordinate system is shown for reference.

Measurement object 101 is positioned some nominal distance from optical assembly 110 along the Z-axis. In many applications, such as where the encoder system is used to monitor the position of a wafer stage or reticle stage in a lithography tool, measurement object 101 is moved relative to the optical assembly in the X- and/or Y-directions while remaining nominally a constant distance from the optical assembly relative to the Z-axis. This constant distance can be relatively small (e.g., a few centimeters or less). However, in such applications, the location of measurement object typically will vary a small amount from the nominally constant distance and the relative orientation of the measurement object within the Cartesian coordinate system can vary by small amounts too. During operation, encoder system 100 monitors one or more of these degrees of freedom of measurement object 101 with respect to encoder head 110, including a position of measurement object 101 with respect to the X-axis, and further including, in certain embodiments, a position of the measurement object 101 with respect to the Y-axis and/or Z-axis and/or with respect to pitch and yaw angular orientations. In some embodiments, the encoder head can be moved with respect to the measurement object 101, whereas in some other embodiments, both the measurement object 101 and the encoder head are moveable.

To monitor the position of measurement object 101, source module 120 directs an input beam 122 to encoder head 110. Encoder head 110 derives a measurement beam 112 from input beam 122 and directs measurement beam 112 to measurement object 101. Encoder head 110 also derives a reference beam (not shown) from input beam 122 and directs the reference beam along a path different from the measurement beam. For example, encoder head 110 can include a beam splitter that splits input beam 122 into measurement beam 112 and the reference beam. The measurement and reference beams can have orthogonal polarizations (e.g., orthogonal linear polarizations).

Measurement object 101 includes an encoder scale 105, which is a measuring graduation that diffracts the measurement beam from the encoder head into one or more diffracted orders. In general, encoder scales can include a variety of different diffractive structures such as gratings or holographic diffractive structures. Examples or gratings include sinusoidal, rectangular, or saw-tooth gratings. Gratings can be characterized by a periodic structure having a constant pitch, but also by more complex periodic structures (e.g., chirped gratings). In general, the encoder scale can diffract the measurement beam into more than one plane. For example, the encoder scale can be a two-dimensional grating that diffracts the measurement beam into diffracted orders in the X-Z and Y-Z planes. The encoder scale extends in the X-Y plane over distances that correspond to the range of the motion of measurement object 110.

In the present embodiment shown in FIG. 1, encoder scale 105 is a grating having grating lines that extend orthogonal to the plane of the page, parallel to the Y-axis of the Cartesian coordinate system shown in FIG. 1. The grating lines are periodic along the X-axis. Encoder scale 105 has a grating plane corresponding to the X-Y plane and the encoder scale diffracts measurement beam 112 into one or more diffracted orders in the X-Z plane.

At least one of these diffracted orders of the measurement beam (labeled beam 114), returns to optical assembly 110, where it is combined with the reference beam to form an output beam 132. For example, the once-diffracted measurement beam 114 can be the positive or negative first-order diffracted beam (i.e., the +1 or −1 diffracted beam).

Output beam 132 includes phase information related to the optical path length difference between the measurement beam and the reference beam. Optical assembly 110 directs output beam 132 to detector module 130 that detects the output beam and sends a signal to electronic processor 150 in response to the detected output beam. Electronic processor 150 receives and analyzes the signal and determines information about one or more degrees of freedom of measurement object 101 relative to optical assembly 110.

In certain embodiments, the measurement and reference beams have a small difference in frequency (e.g., a difference in the kHz to MHz range) to produce an interferometry signal of interest at a frequency generally corresponding to this frequency difference. This frequency is hereinafter referred to interchangeably as the "heterodyne" frequency or the "reference" frequency, and is denoted as (OR (with respect to angular frequency). Information about the changes in the relative position of the measurement object generally corresponds to a phase of the interferometry signal at this heterodyne frequency. Signal processing techniques can be used to extract this phase. In general, the moveable measurement object causes this phase term to be time-varying. In this regard, the first order time derivative of the measurement object movement causes the frequency of the interferometry signal to shift from the heterodyne frequency by an amount referred to herein as the "Doppler" shift.

The different frequencies of the measurement and reference beams can be produced, for example, by laser Zeeman splitting, by acousto-optical modulation, using two different laser modes, or internal to the laser using birefringent elements, among other techniques. The orthogonal polarizations allow a polarizing beam-splitter to direct the measurement and reference beams along different paths, and combine them to form the output beam that subsequently passes through a polarizer, which mixes the orthogonally polarized components so they can interfere. In the absence of target motion the interference signal oscillates at the heterodyne frequency, which is just the difference in the optical frequencies of the two components. In the presence of motion the heterodyne frequency incurs a change related to the velocity of the target through well-known Doppler relations. Accordingly, monitoring changes in the heterodyne frequency allows one to monitor motion of the target relative to the optical assembly.

In the embodiments described below, the "input beam" generally refers to the beam emitted by the light source module. For heterodyne detection, the input beam can include components having slightly different frequencies, as discussed above.

While encoder scale 105 is depicted in FIG. 1 as a structure that is periodic in one direction, more generally, the measurement object can include a variety of different diffractive structures that appropriately diffract the measurement beam. In some embodiments, the measurement object can include a diffractive structure that is periodic in two directions (e.g., along the X- and Y-axis), diffracting the measurement beam into beams in two orthogonal planes. In general, the diffractive structure of the encoder scale and source module are selected so that the encoder system provides one or more diffracted measurement beams having sufficient intensity to establish one or more detectable interference signals when combined with corresponding reference beams, within the geometrical constraints for the system. In some embodiments, the source module provides an input beam having a wavelength in a range from 400 nm to 1,600 nm. For example, the input beam can have a wavelength of about 633 nm, about 980 nm or about 1550 nm. Note that, in general, the frequency splitting of the heterodyne source results in only a very small difference between the wavelength of the two components of the input beam, so even though the input beam is not strictly monochromatic it remains practical to characterize the input beam by a single wavelength. In some embodiments, the source module can include a HeNe laser, a laser diode or other solid-state laser source, a light-emitting diode, or a thermal source such as a halogen light with or without a filter to modify the spectral bandwidth.

In general, the design of the encoder scale can vary depending on the wavelength of the input beam and the arrangement of optical assembly and diffracted orders used for the measurement. In some embodiments, the diffractive structure is a grating having a pitch in a range from about 1× to about 20×, where λ is a wavelength of the source. The grating can have a pitch, for example, in a range from about 0.5 μm to about 10 μm.

In some embodiments, the encoder system is arranged so that the measurement beam makes a double pass to the encoder scale and a twice diffracted order of the measurement beam is used for the measurement. For example, referring to FIG. 2, an interferometric heterodyne optical encoder system 200 includes an encoder head 210 having a reference retroreflector 212, a measurement retroreflector 214, and a polarizing beam-splitter 216. The system 200 also contains a target 201, a laser source 218, a detector module 240 including a detector 242 and an electronic processor 250. The detector module 240 or the encoder head 210 may also include a polarizer 244. A Cartesian coordinate system is shown for reference.

Figure 2:
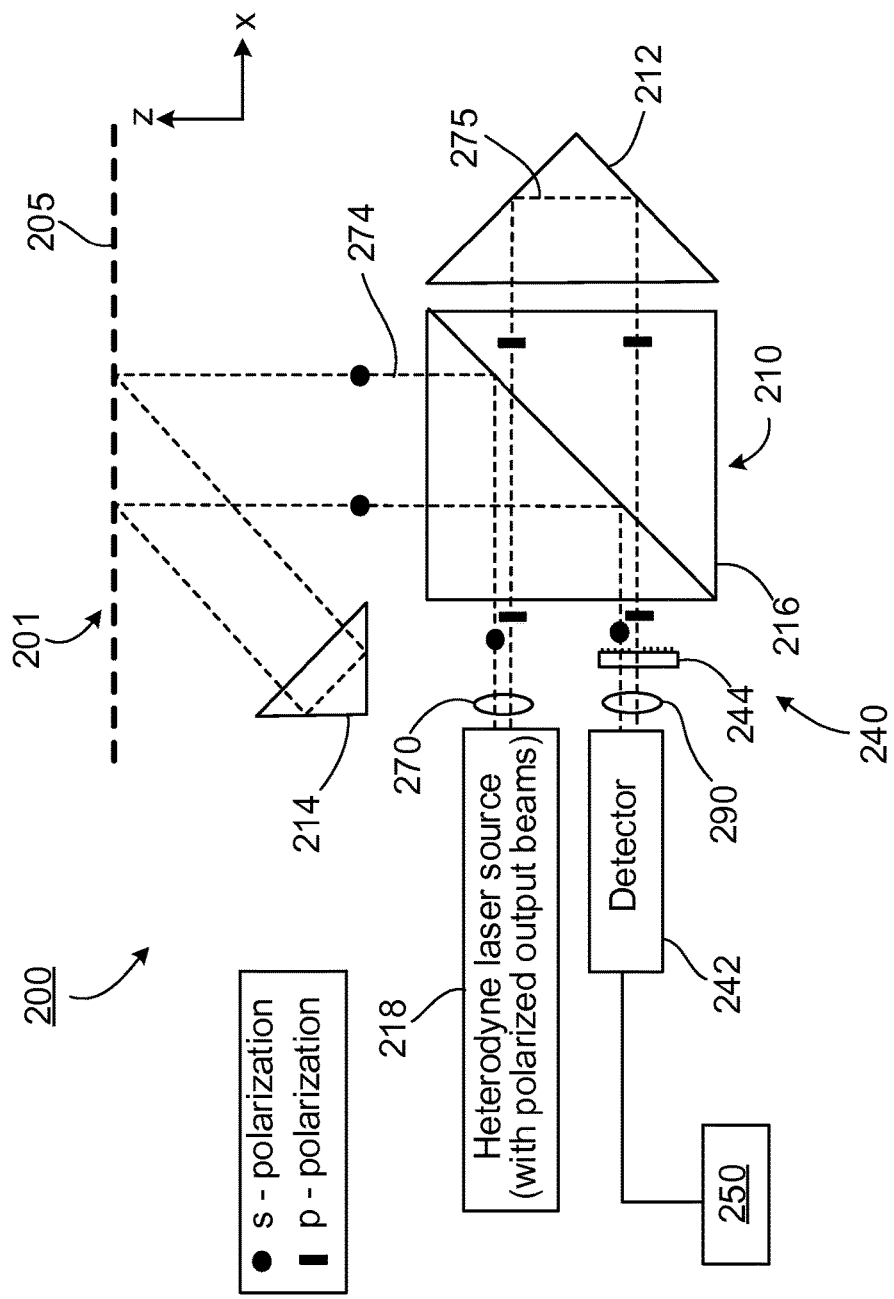
FIG. 2 is a schematic diagram of an embodiment of an interferometric optical encoder system.

To perform the monitoring, heterodyne laser source 218 directs an input beam 270 to polarizing beam-splitter 216. Polarizing beam-splitter 216 derives a measurement beam 274 and a reference beam 275 from input beam 270, where the polarizations of the measurement beam 274 and reference beam 275 are orthogonal. As shown in the example of FIG. 2, measurement beam 274 is polarized orthogonal to the plane of the figure (s-polarization), while secondary beam 275 is polarized in the plane of the figure (p-polarization). However, the measurement beam and reference beam can have any polarization (e.g., linear, circular, or elliptical) as long as they are distinguishable from one another (e.g., orthogonally polarized).

The beam-splitter 216 directs the measurement beam 274 to target 201. Target 201 can include an encoder scale 205 that diffracts the incident measurement beam 274, providing a once-diffracted measurement beam that corresponds to a non-zeroth diffracted order (e.g., first order or second order) of measurement beam 274. The diffracted measurement beam 274 then is redirected by measurement retroreflector 214 to impinge on the encoder scale 205 once more to provide a twice-diffracted measurement beam. The twice-diffracted measurement beam 274 then returns to polarizing beam-splitter 216. The polarizing beam-splitter 216 then combines the twice-diffracted measurement beam 274 with the reference beam 275 to form an output beam 290, where the reference beam 275 has been redirected by the reference retroreflector 212. Although FIG. 2 shows a polarizing beam-splitter, other optical components may be used that also direct beams based on polarization properties. These optical components include, for example, prism cubes, diffractive optics, birefringent components and reflective surfaces (bare or coated) on which beams are incident at glancing angles. Similarly, optical components other than the retro-reflector and/or other combination of optical components can be used in the encoder system 200 to redirect the reference beam along a direction that is coincident with the diffracted measurement beam toward the detector module 240.

The output beam 290 includes phase information related to the optical path difference between the component corresponding to the twice-diffracted measurement beam and the component corresponding to the reference beam. Polarizing beam-splitter 216 then directs output beam 290 to detector module 240. At detector module 240, polarizer 244 mixes the measurement and reference beam components of the output beam 290 before the output beam is incident on detector 242. This can be achieved, for example, by orienting the transmission axis of polarizer 244 so that it transmits a component of s-polarized light and a component of p-polarized light (e.g., by orienting the transmission axis at 45° with respect to the plane of the page). Although only a single retroreflector is shown, one or more additional retroreflectors (not shown) can be positioned to receive other diffracted measurement beams and redirect those beams back to the encoder scale to obtain an additional twice-diffracted measurement beam. For instance, one retroreflector can be arranged to redirect the +1 diffracted measurement beam back to the encoder scale whereas the other retroreflector can be arranged to redirect the −1 diffracted measurement beam back to the encoder scale. The beamsplitter 216 would then receive each twice diffracted measurement beam and combine them with their corresponding reference beam to form two output beams (i.e., one for each channel). In some implementations, the encoder scale may include a two-dimensional periodic pattern, such that two additional retroreflectors may be positioned to receive and redirect the diffraction orders in the orthogonal plane (e.g., the y-z plane in FIG. 2).

Upon detecting the mixed components of the output beam 290, the detector 242 of detector module 240 subsequently sends a signal to electronic processor 250 in response. Electronic processor 250 receives and analyses the signal and determines information about one or more degrees of freedom of target 201 relative to the optical assembly 210. Specifically, the electronic processor determines this information based in part on a heterodyne phase of the signal. Accordingly, monitoring changes in the heterodyne frequency allows one to monitor motion of the target 201 relative to the optical assembly 210.

Introducing Angle of Separation Between Diffracted Measurement Beams

As explained above, when utilizing multiple diffracted measurement beams to perform measurements of displacement and position, interferometric encoder systems typically keep the diffracted measurement beams physically separate by a safe margin in order to avoid pollution of one measurement beam with light originating from another measurement beam at the detector. Keeping the measurement beams at such distances may hinder or preclude reducing the system weight and volume. To enable further reduction in the system size and weight, an encoder system, such as any of the encoder systems contemplated by the embodiments of FIGS. 1-2, may be modified to introduce a relatively small intentional angle difference between the returning diffracted measurement beams.

Figure 3:
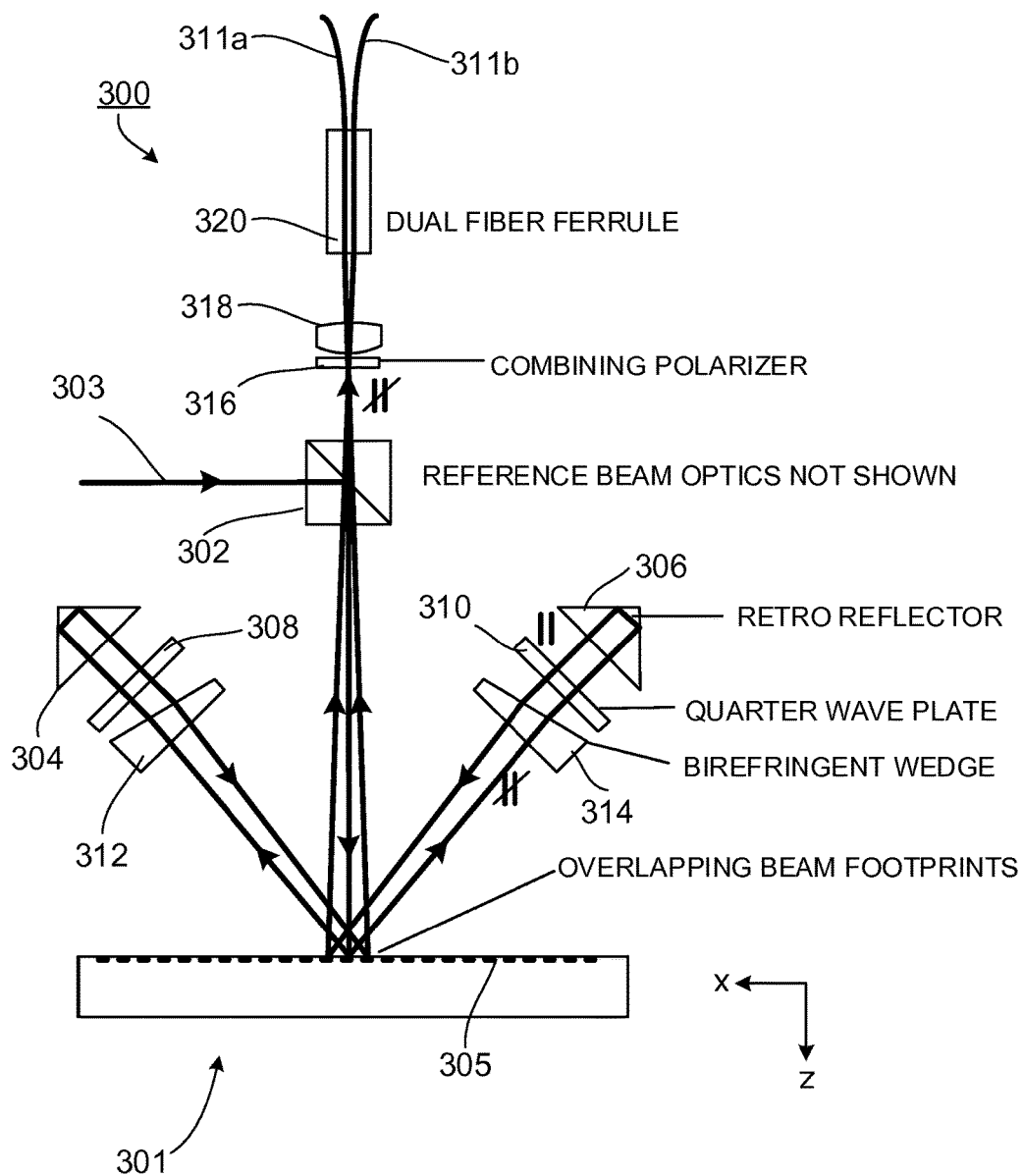
FIG. 3 is a schematic diagram of an embodiment of an interferometric optical encoder system.

An example of this approach is shown in FIG. 3. FIG. 3 is a schematic of an interferometric encoder system 300, which is a modified version of the encoder systems described with respect to FIGS. 1-2. Similar to the encoder systems of FIGS. 1-2, encoder system 300 includes a target 301 having an encoder scale 305, a beam splitting optical component 302, a first retroreflector 304, a second retroreflector 306, and a polarizer 316. System 300 also includes a first quarter wave plate 308, a second quarter wave plate 310, a first birefringent wedge prism 312, a second birefringent wedge prism 314, a focusing lens 318 and a dual optical fiber ferrule 320. For ease of viewing, the light source module, detector module, and reference beam optics of the system 300 are not shown.

During operation of system 300, the beam splitting optical component 302 receives an input beam 303 from the light source module (e.g., a heterodyne laser source). The input beam 303 may be composed of both a measurement beam portion and a reference beam portion, each of which has a different polarization. The optical component 302 splits the input beam into a measurement beam and reference beam (not shown). The measurement beam is redirected by the beam splitting component 302 towards the encoder scale 305, where the measurement beam is diffracted. In the present example, the encoder scale 305 is a 1-D periodic grating, giving rise to diffracted beams in the X-Z plane, though 2-D gratings may be used instead. Additionally, although only +1 and −1 diffraction orders are shown in FIG. 3, other diffracted beams also are produced as a result of the measurement beam impinging on the encoder scale 305. The retroreflectors 304, 306 are positioned and arranged to receive and redirect the +1$^{st}$ and −1$^{st}$ diffraction orders of the single measurement beam back to the encoder scale 305, where they are diffracted a second time.

The presence of the quarter wave plates 308, 310 and the birefringent wedge prisms 312, 314 introduces a slight deviation in the propagation direction of the once-diffracted measurement beams as the beams propagate back toward the encoder scale 305. If the birefringent wedges and quarter wave plates were not located between the encoder scale 305 and retroreflectors 304, 306, both measurement beams would be parallel after the second diffraction event.

A birefringent prism may refer to an optical component that causes the separation of light, on passing through the prism, into two unequally refracted orthogonally polarized rays. An input beam traveling through a birefringent prism may undergo a change in propagation direction due to the angled prism face, in which the magnitude of the change in direction varies depending on the polarization of the input beam. For instance, an input beam having a first type of polarization may be deviated by a larger angle than an input beam having a second type of polarization that is orthogonal to the first type of polarization. A quarter-wave plate may refer to a plate that introduces a phase difference of one-quarter cycle between the ordinary and extraordinary rays passing through it to change the rays' polarization.

Accordingly, each of the birefringent prism/quarter-wave plate pairs (312, 308 and 314, 310) are arranged such that a beam having a first type of polarization is refracted by a first angle upon passing through the birefringent prism, changes polarization (e.g., by 90°) after twice passing through the quarter-wave plate, and then is refracted by a second different angle upon making a second pass through the birefringent prism on its way back to the encoder scale. For example, in the setup shown in FIG. 3, the polarization of the measurement beam is chosen so that it switches from a first polarization (e.g., S-polarization, where the polarization vector is orthogonal to the diffraction plane) before making a first pass through the prisms 308, 310 to a second polarization (e.g., P-polarization, where the polarization vector is in the diffraction plane) before making a second pass through the prisms 308, 310. As a result, the angle change imposed by the birefringent prisms 308, 310 the second time each beam passes through the prism is different from the first time each beam passes through the prism.

After the second diffraction event at the encoder scale 305, the two returning beams now travel commonly in a general direction toward the beam splitting optical component 302, but with a slight angular separation between one another. The angular separation shown here is exaggerated to aid understanding of the system operation. The focusing lens 318 turns the angular separation into a spatial separation at focal length distance from the lens. Although not shown, each measurement beam propagates co-linearly with a corresponding reference beam such that there are two output beams (i.e., one output beam for each channel). At the focal length distance from the lens 318, a first and second detector can be positioned to measure the intensity of the first and second output beams, respectively. Alternatively, as shown in FIG. 3, the two beams may be coupled into two separate fibers, each of which in turn leads to a separate detector that is configured to detect the intensity of the output beam it receives.

If implemented as shown in FIG. 3, the input faces of the optical fibers 311a, 311b, which are illustrated as being contained in an optical ferrule 320, are separated by a distance, D. The separation distance D and the chosen focal length f of the lens 318 determine the required angular separation $\Delta\alpha$ between the two beams. This angular separation can be expressed as:

$$\Delta \alpha = \frac{D}{f} \quad (1)$$

For example, for a HeNe beam having a wavelength of 633 nm, with D=125 µm (a very common separation of fibers in a dual fiber ferrule) and f=10 mm, the required angular separation of the beams would be 12.5 mrad. A 12.5 mrad angular separation can be achieved by forming the birefringent wedge prisms 312, 214 as rutile wedge prisms having wedge angles of 1.6°. Thus, in practice, the separation angle may be determined based on the hardware components such as the fiber separation in the ferrule and the collimation lens. It is preferable in certain implementations to provide at a minimum several waves of wavefront difference across the beam diameter to separate the two beams. For example, for a 2 mm diameter HeNe laser beam, a 1 mrad angular separation, which corresponds to greater than 3 waves of difference across the beam diameter, would provide the preferred separation.

For clarity, the birefringent wedge prisms 312, 314 in FIG. 3 are wedged in the plane of the drawing. In practice, however, wedge orientations are preferably chosen so as to direct any beams resulting from unwanted diffraction orders away from the desired beams and thereby prevent them from contributing to the interference signals.

As indicated above, FIG. 3 does not show the path of the reference beams. For the embodiment shown in FIG. 3 one may provide optics that split the reference beam into two reference beams and direct the two reference beams at the appropriate angle so that they end up propagating parallel to and co-linear with the respective measurement beams as they enter the combining polarizer 316 just before the focusing lens 318. Further discussion of how such reference beams may be generated is set forth herein with respect to FIGS. 7A-7D. The embodiment shown in FIG. 3 includes two measurement beams originating from a single input beam. However, the same principle can be applied to encoder systems that use 2D gratings and up to four measurement beams. As before, the incoming beam would split into different diffraction orders (this time four of them, e.g., +1 and −1 orders along the X-Z plane and +1 and −1 orders along the Y-Z plane in FIG. 3) which would return to substantially the same location on the encoder scale (e.g., a separation between the beams of less than a beam radius) after being redirected by the retroreflectors, polarizing wave-plates and wedges. The twice-diffracted beams then are combined with reference beams to form multiple output beams that propagate toward separate detectors, each of which is configured to detect the intensity of the output beam that the detector receives. As in the example of FIG. 3, each output beam may be coupled into a separate fiber before passing to the corresponding detector.

FIGS. 4A and 4B are schematics that illustrate a direct comparison between two encoder systems, where the system shown in FIG. 4A does not introduce a slight angular deviation between the diffracted beams and the system shown in FIG. 4B does introduce the slight angular deviation (the system shown in FIG. 4B is identical to the system shown in FIG. 3).

The comparison exhibited in FIGS. 4A and 4B demonstrates the space and material saving potential of providing the slight angular deviation between the diffracted beams. For example, the beam splitter in the configuration shown in FIG. 4B can be made smaller than the beam splitter in FIG. 4A since the returning diffracted measurement beams substantially overlap one another as they propagate toward the optical fibers (or detectors), reducing the area required by the beam-splitting interface. The retroreflectors in the configuration shown in FIG. 4B also can be made smaller than the retroreflectors in FIG. 4A since the once-diffracted measurement beams can be directed close to the retroreflector apex (shown in FIGS. 3 and 4B with a small offset for better visibility of the beams). Additionally, the two fiber coupling assemblies required in the system of FIG. 4A are reduced to one in the system of FIG. 4B. Moreover, the smaller combined beam footprint (i.e., the region over which the measurement beam is incident on the encoder scale) on the encoder scale allows one to utilize an encoder scale having a smaller periodic pattern or grating size.

Figure 5A:
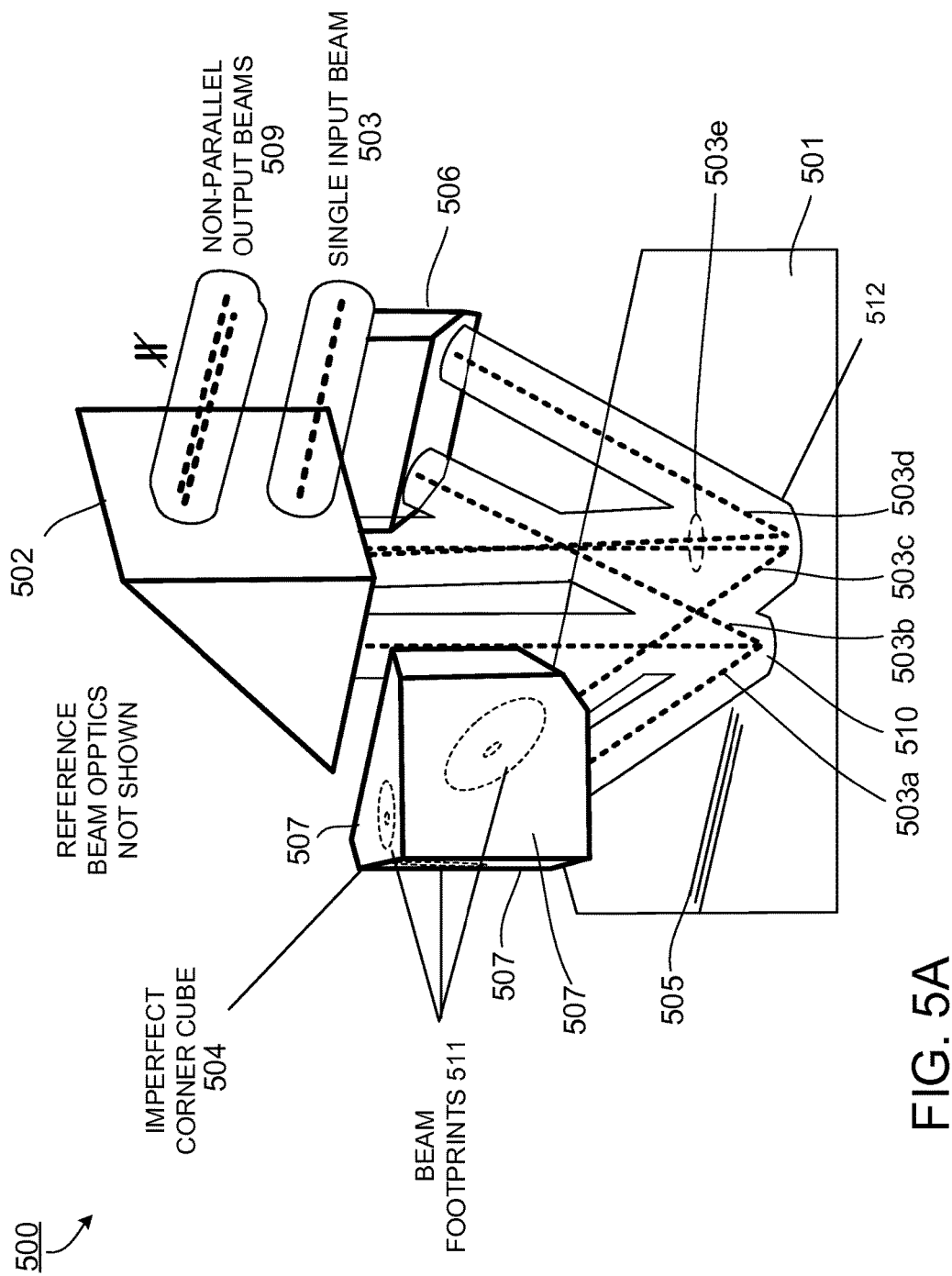
FIG. 5A is a schematic diagram of an embodiment of an encoder head of an interferometric optical encoder system.

In some embodiments, the angular separation between the diffracted beams can be introduced by modifying the shape of the retroreflectors. For instance, FIG. 5A is a schematic that illustrates an example of an encoder head 500 of an interferometric encoder system, in which the angular separation of two output beams (diffracted measurement beams) is accomplished using two intentionally imperfect retroreflectors. Each imperfect retroreflector includes multiple facets for reflecting the diffracted measurement beam, in which the angle between the reflecting facets is chosen to deviate slightly from 90°.

During operation of encoder head 500 as part of an interferometric encoder system, a first reflector 502 receives an input beam 503 from a light source (e.g., a heterodyne laser source), where the input beam 503 may be composed of both a measurement beam portion and a reference beam portion, each of which has a different polarization. The first reflector 502 may be part of, for example, a beam splitter that separates the input beam 503 into a measurement beam that is redirected toward an encoder scale 505 on a measurement object 501, and into a reference beam. For ease of viewing, the reference beam and reference beam optics are not shown as part of encoder head 500. In the example of FIG. 5A, the encoder scale 505 includes a 1D grating (e.g., periodic array of parallel grating lines) that diffracts the measurement beam at a first region of incidence 510 into different diffraction orders (e.g., +1 and −1 diffraction orders). For ease of viewing, only a portion of the grating lines that form the encoder scale 505 is shown.

Two imperfect retroreflectors 504, 506 each receive a corresponding once-diffracted measurement beam from the encoder scale 505. For instance, the retroreflector 504 may receive the +1 diffraction order 503a from the encoder scale 505, whereas the retroreflector 506 may receive the −1 diffraction order 503b from the encoder scale 505. In some implementations, additional imperfect retroreflectors also may be included with the encoder head 500 to receive, e.g., diffracted measurement beams propagating along a plane that is orthogonal to the plane in which beams 503a, 503b travel, such as would occur in the case of an encoder scale having a 2D grating.

The diffracted measurement beam 503a received by retroreflector 504 is reflected by multiple reflecting facets of the retroreflector 504 back to the surface of the encoder scale 505 as beam 503c. The footprints of the beam reflecting off of the facets of retroreflector 504 are depicted using the ellipse/oval shaped boundaries 511. Thus, in the example shown in FIG. 5A, the retroreflector 504 includes three reflecting facets 507 for reflecting the diffracted measurement beam back to the encoder scale 505. The internal surfaces of the retroreflectors 506, 507 may be mirrored to induce the reflection or the beams mat reflect due to total internal reflection. As a result of the slight deviation from 90° between adjacent reflecting facets 507 of the reflectors 504, the reflected measurement beam 503c does not counter-propagate exactly parallel with the diffracted beam 503a that enters into the imperfect reflector 504. Retroreflector 506 is partially obstructed in the view shown in FIG. 5A, but it operates in a similar manner to retroreflector 504. That is, retroreflector 506 receives the diffracted beam 503b from the encoder scale 505 and redirects it towards encoder scale 505 as beam 503d. The angles between the adjacent reflecting facets of retroreflector 506 that redirect the diffracted measurement beam deviate slightly from 90° so that beam 503d does not counter-propagate exactly parallel with beam 503b.

FIG. 5B is a schematic that illustrates a two-dimensional side view of an imperfect retro-reflector 550, such as the retro-reflectors used in FIG. 5A, having non-90° facet angles for redirecting input beam 551. If the deviation from 90° is $\Delta\alpha$, the beam 552 exiting the retro-reflector will have an angle of $2n\Delta\alpha$ with respect to the incoming beam direction, where n is the refractive index of the glass. Rather than form the retro-reflector itself to be imperfect, it is also possible to introduce an additional optical component that alters the path of the light beam from the retro-reflector. For instance, FIG. 5C is a schematic that illustrates a two-dimensional side view of an example perfect retro-reflector (i.e., having a 90° corner angle) 553 made imperfect by the addition of a glass wedge 554 that is passed only once by the beam.

Referring again to FIG. 5A, the reflecting facets of each reflector 504, 506 may form a variety of different angles with one another that are close to 90° in order to introduce the deviation between the diffracted measurement beams. For instance, the facets may form an angle with one another that deviates from 90° by about ±10°, 5°, 3°, 2°, 1°, 0.8°, 0.6°, 0.5°, 0.4°, 0.3°, 0.2°, or 0.1°, among others. In some implementations, the retro-reflectors used to redirect the measurement beams (e.g., retro-reflectors 504, 506) may deviate from 90° by different amounts or by the same amount.

The redirected once-diffracted measurement beams 503c, 503d exit the reflectors 504, 506 and are incident on the encoder scale 505 at a second region of incidence 512, where each of the beams 503c, 503d diffract from the encoder scale 505 for a second time. Of the multiple twice-diffracted beams produced by this second interaction with encoder scale 505, at least two beams 503e propagate back toward the reflector 502—one resulting from the diffraction of beam 503c, the other resulting from diffraction of beam 503d. Due to the slight angular deviations introduced into the corner cubes 504, 506, certain differences are observable. First, as shown in FIG. 5, the center of beam 503c exiting reflector 504 impinges on the encoder scale 505 at a position that is slightly displaced from the location at which the center of beam 503d exiting reflector 506 impinges on the encoder scale 505. As a result, the area of impact of beams 503c and 503d partially overlap. Second, the propagation directions of the twice-diffracted beams 503e toward reflector 502 are non-parallel. Accordingly, when beams 503e are redirected by reflector 502, the beams are non-parallel as they leave the encoder head 500. The angular separation between beams 503e shown here is exaggerated to aid understanding of the system operation. Each of the beams 503e is paired with a corresponding reference beam (not shown) to form a corresponding output beam 509. Each reference beam propagates co-linearly along the same path with its corresponding diffracted beam. As a result, the output beams 509 also are non-parallel with one another. As in the implementation shown in FIG. 3, the output beams 509 are directed to corresponding detectors where their intensity is recorded. In some implementations, the output beams 509 may be directed toward a focusing lens that converts the angular separation between the beams into a spatial separation at focal length distance from the lens. The output beams 509 then may be coupled into separate fibers that lead to the detector modules or may fed to the detector modules directly. As explained herein, the separation distance D and selected focal length f of the lens determine the acceptable angular separation between the output beams. In some embodiments, "perfect" retro-reflectors may be used instead of imperfect retro-reflectors. "Perfect" retro-reflectors include, for example, retro-reflectors that reflect an incident beam so it counter-propagates in parallel with the optical path of the incident beam. Such "perfect" retro-reflectors include reflectors having at least two reflecting facets arranged such that the wavefront error (including tilt) after reflection is a small fraction of a wave. For instance, for a 2 mm diameter beam, the apex angle (the angle between the reflecting facets) of a perfect retro-reflector should be controlled to within a few arcseconds.

The perfect retro-reflectors may be used in combination with glass wedges, through which each measurement beam passes just once, either before or after being redirected by the retroreflector such as in FIG. 5C. Since the measurement beam makes just a single pass through the wedge, the wedge does not need to be birefringent, in contrast to the wedges 312, 314 of the embodiment shown in FIG. 3. The beams in such an embodiment do not cross any facet edges of the retroreflectors, which could otherwise lead to diffraction losses and polarization variation across the beam front in certain implementations.

In some embodiments, a monolithic optical component may be used to direct the measurement beam to the encoder scale, to introduce an angular separation between the twice-diffracted beams, and to receive the twice diffracted measurement beams. In reference to an optical component, "monolithic" may be understood, in some implementations, to mean composed as a single integral object. For example, the monolithic optical component may be understood to be a single object having a substantially uniform material composition throughout the body of the object. In some implementations, the monolithic object may be understood to include a single object formed (e.g., machined, sculpted, molded, shaped) from a single piece of material. In some implementations, the monolithic object may be understood to be a single object formed by combining (e.g., fusing, cementing, bonding, welding) two or more objects together. In some implementations, such as when the monolithic optical component is configured to derive multiple beams from a single beam (e.g., when used as a beam-splitter), the monolithic optical component may include one or more internal beam-splitting interfaces.

Figure 6:
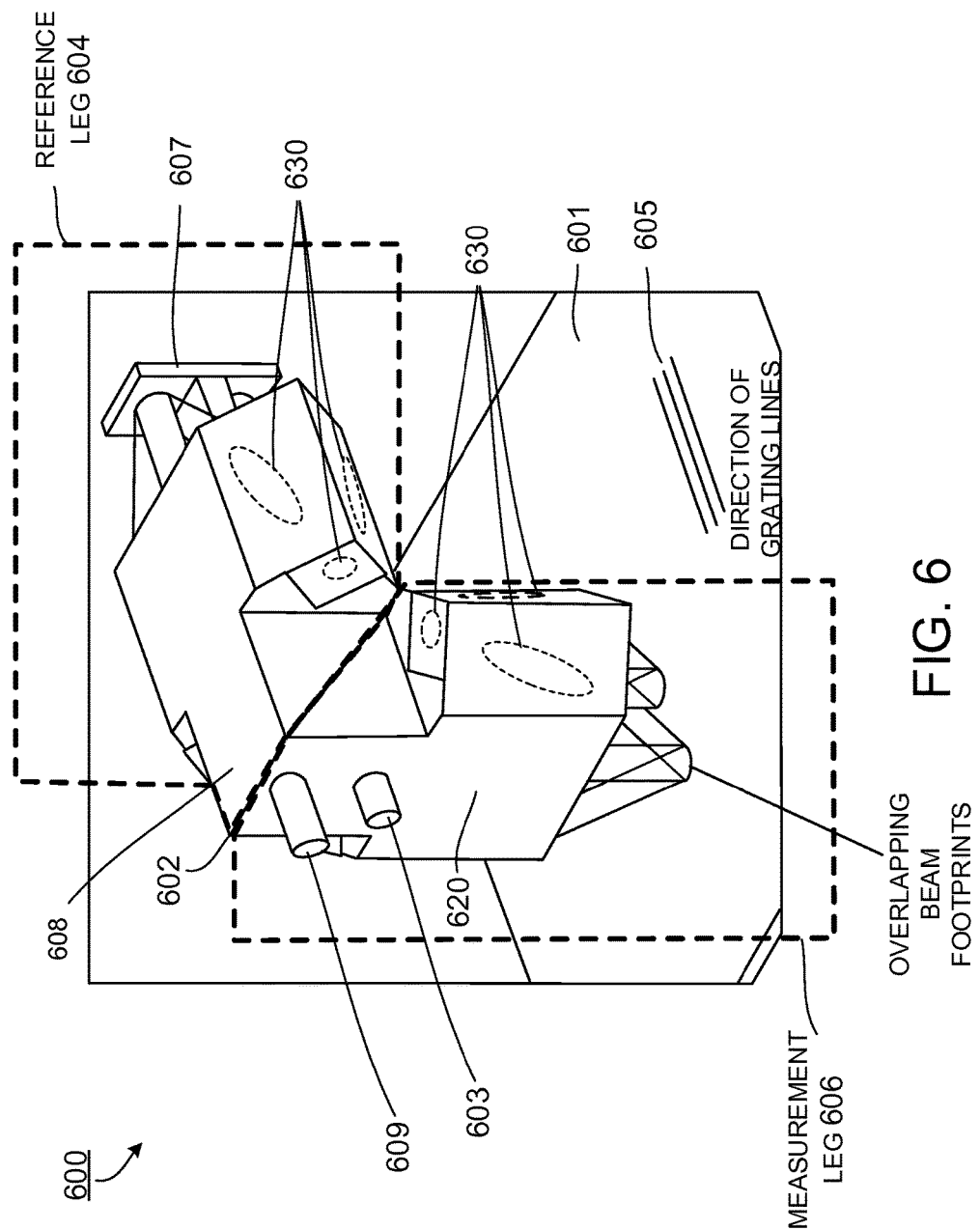
FIG. 6 is a schematic diagram of an embodiment of an encoder head of an interferometric optical encoder system.

An example of an encoder head that employs a monolithic optical component to introduce an angular separation between diffracted measurement beams is depicted in FIG. 6. As shown in FIG. 6, the encoder head 600 includes a monolithic optical component 602 and reference diffraction grating 607. The monolithic optical component 602 may be understood as having two portions: a reference leg portion 604 and a measurement leg portion 606.

During operation of the encoder head 600, the measurement leg portion 606 receives an input beam 603 at a first facet 620. The input beam 603 is obtained from a light source (e.g., heterodyne laser source) and is composed of both a measurement beam portion and a reference beam portion, each of which has a different polarization. The reference beam portion is directed by the component 602 to the reference grating 607, whereas the measurement beam portion is redirected to the encoder scale 605 along a direction orthogonal to the reference beam pathway. For instance, the monolithic optical component 602 may include an internal beam-splitting interface (not shown) arranged to split the measurement and reference beams along different paths. In the example shown in FIG. 6, the monolithic optical component 602 includes a polarizing beam splitter portion 608 that is configured to split the input beam 603 based on the polarization differences between the measurement and reference beams. The polarizing beam splitter 608 may be understood as being between both the measurement leg portion 606 and part of the reference leg portion 604.

The encoder scale 605 is located at or on a measurement object 601 and includes a 1D grating (e.g., periodic array of parallel grating lines). For ease of viewing, only a portion of the grating lines that form the encoder scale 605 is shown. The measurement beam is redirected by the beam-splitting interface toward the encoder scale 605. Upon impinging the surface of the encoder scale 605, the measurement beam is diffracted along multiple different pathways, in which two different diffraction orders (e.g., +1 and −1 diffracted beams) travel toward the measurement leg portion 606. Once the diffracted measurement beams reach the measurement leg portion 606, the beams are redirected by multiple reflecting facets of component 602 along a path back toward the encoder scale 605. The example component 602 includes 6 reflecting facets, 3 of which are used to redirect a first diffracted measurement beam and another 3 of which are used to redirect a second diffracted measurement beam. The footprints 630 of the beams as they are reflected from the reflecting facets are depicted as dashed line ovals. As in the implementation shown in FIG. 5, the angles between the adjacent reflecting facets that redirect each diffracted measurement beam deviate slightly from 90° so that each diffracted beam exiting the component towards encoder scale 605 does not counter-propagate exactly parallel with its corresponding once-diffracted beam that enters the component 602. The reflecting facets may form a variety of different angles with one another that are close to 90° in order to introduce the deviation between the diffracted measurement beams. For instance, the facets may form an angle with one another that deviates from 90° by about ±10°, 5°, 3°, 2°, 1°, 0.8°, 0.6°, 0.5°, 0.4°, 0.3°, 0.2°, or 0.1°, among others.

The centers of the once-diffracted measurement beams exiting the component 602 impinge on the surface of the encoder scale 605 such that the footprints (area of impact) of each beam partially overlap. Of the multiple twice-diffracted beams produced by this second interaction with encoder scale 605, at least two beams propagate back toward the measurement leg portion 606 of the optical component 602. The propagation directions of the twice-diffracted beams traveling toward optical component 602 are non-parallel as a result of the slight angular deviations introduced between the facets of the optical component 602 that reflect the measurement beam.

In the example shown in FIG. 6, the reference leg portion 604 constructed so that the reference beam follows a path that matches the measurement beam path, but where the reference beam impinges on reference grating 607 instead of the encoder scale 605. That is, after a first impact on the reference grating 607, multiple once-diffracted reference beams are produced. At least two of those diffracted reference beams (e.g., +1 and −1 orders) travel back to the reference leg portion 604 of the optical component 602. Within the optical component 602, the once-diffracted reference beams reflect off several facets and are redirected back to the reference grating 607.

The angles between the facets that redirect the reference beam back to the reference grating 607 deviate slightly from 90° so that the beams do not counter-propagate exactly parallel with the once-diffracted reference beams entering the reference leg portion 604. The reflecting facets of the reference leg portion 604 may form a variety of different angles with one another that are close to 90° in order to introduce the deviation between the diffracted reference beams. For instance, the facets may form an angle with one another that deviates from 90° by about ±10°, 5°, 3°, 2°, 1°, 0.8°, 0.6°, 0.5°, 0.4°, 0.3°, 0.2°, or 0.1°, among others. In certain implementations, the angles between the reflecting facets and the reference grating properties (e.g., groove width, pitch) are the same as those used for the reflecting facets of the measurement leg 606 and encoder scale 601, respectively.

The centers of the once-diffracted reference beams exiting the component 602 impinge on the surface of the reference object 607 such that the footprints (areas of impact) of each beam partially overlap. Of the multiple twice-diffracted beams produced by this second interaction with reference object 607, at least two beams propagate back toward the reference leg portion 604 of the optical component 602. The propagation directions of the twice-diffracted beams traveling toward optical component 602 are non-parallel as a result of the slight angular deviations introduced between the facets of the optical component 602 that reflect the reference beams.

Upon reaching the polarizing beam splitter portion 608 of the optical component 602, the beam splitter 608 combines each twice-diffracted reference beam with a corresponding twice-diffracted measurement beam to produce multiple output beams 609 (shown in FIG. 6 as a single region 609). That is, each diffracted reference beam propagates co-linearly along the same path as a corresponding diffracted measurement beam. Due to the slight deviation from 90° between the reflecting facets of the reference leg portion 604 and between the reflecting facets of the measurement leg portion 606, the output beams 609 travel with a slight angular separation between them toward the detector components.

Figures 7A, 7B, 7C:
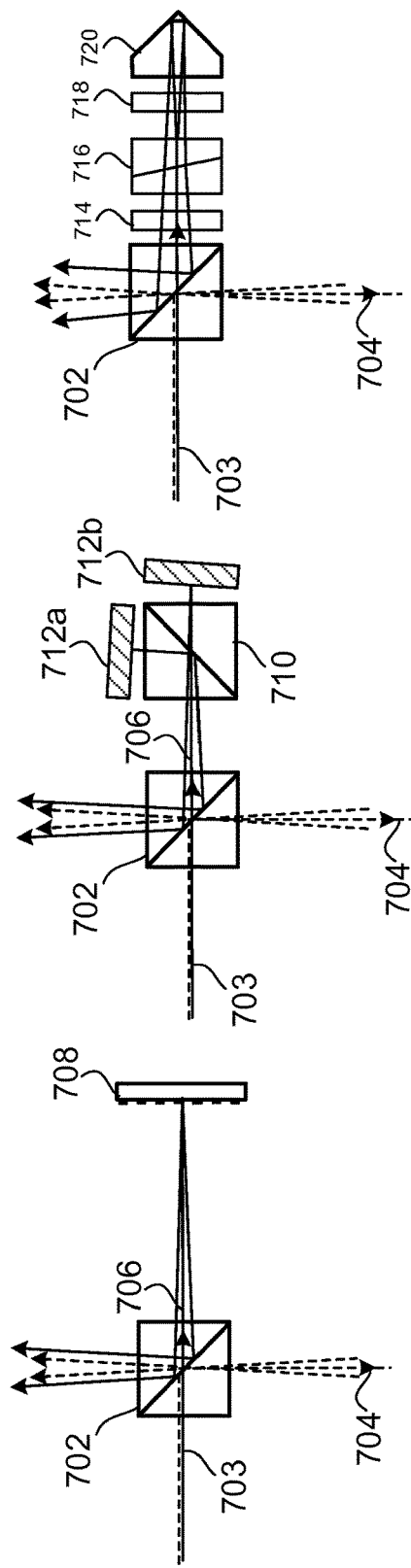
FIGS. 7A-7F are schematics illustrating examples of optical elements of an encoder head that are arranged to impart angular separation to reference beams.
Figures 7D, 7E, 7F:
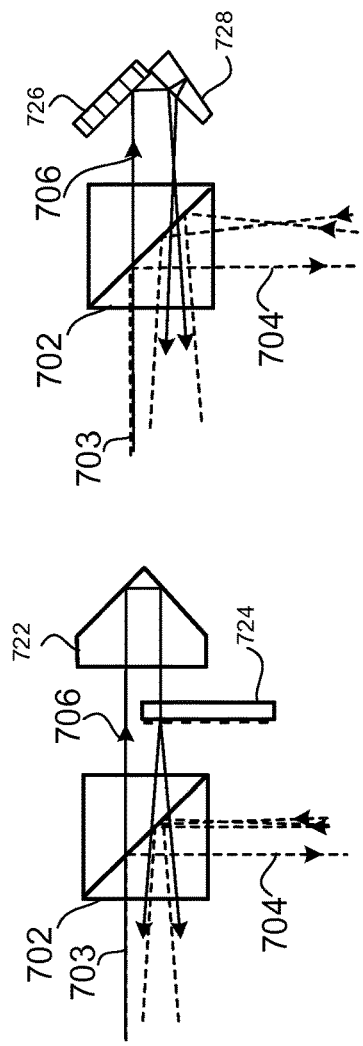

For multiple embodiments shown herein, the reference beam(s) and/or reference optical components have been omitted for clarity. Various different configurations of the reference optical components may be used to produce reference beams having the same slight angular deviation as the corresponding diffracted measurement beams they are intended to interfere with so that each reference beam-diffracted measurement beam pair propagates toward a detector (or, e.g., fiber ferrule). For example, FIGS. 7A-7F depict schematics that each illustrate a different collection of optical components arranged to provide reference beams that propagate co-linearly with and parallel to corresponding measurement beams. In each implementation, a beam splitter that is either polarizing or non-polarizing is used to separate the input beam into a measurement beam and a reference beam. In some implementations, multiple reference beams are generated with the use of a diffraction grating (see FIGS. 7A and 7D), mirrored/reflecting surfaces (FIGS. 7B and 7E), or birefringent elements (FIGS. 7C and 7F). The implementations shown in FIG. 7A-7C are designed to operate so the multiple reference beams are derived by reflection, which allows the reference beams to return to the beam splitter with low shear with respect to the input beam. The implementations shown in FIGS. 7D-7F designed to operate so the multiple reference beams are derived by transmission, which allows the beams to come back with significant shear with respect to the input beam.

In the first implementation shown in FIG. 7A, a beam splitting optical component 702 receives an input beam 703 from a light source module (e.g., a HeNe heterodyne laser source). The input beam 703 may be composed of both a measurement beam portion and a reference beam portion, each of which has a different polarization. The beam splitter 702 splits the input beam into a measurement beam and reference beam. The measurement beam 704 is directed toward an encoder scale associated with a measurement object as described, e.g., herein with respect to FIG. 3. The reference beam 706, however, is redirected to a reference scale 708 (e.g., a diffraction grating) where it is diffracted into multiple beams that travel back toward the beam splitter 702. The beam splitter 702 then combines each diffracted measurement beam with a corresponding diffracted measurement beam such that each measurement-reference beam pair propagates toward a detector (or fiber ferrule) with an angular separation (i.e., non-parallel). To ensure that each diffracted reference beams travels along the same direction and path as its corresponding measurement beam, the pitch of the grating marks on the reference scale 708 are spaced to achieve the desired angular separation. For example, for a 1D grating and a 12.5 mrad angular separation, the pitch may be 101 μm so that each of the +1 and −1 diffracted beams travel along the same path as the corresponding measurement beams derived in the example set forth in FIG. 3.

In the implementation shown in FIG. 7B, both a first beam splitter 702 and a second beam splitter 710 are used. Again, the first beam splitter 702 splits the input beam 703 into a measurement beam 704 and reference beam 706. The measurement beam 704 is directed toward an encoder scale associated with a measurement object as described herein, e.g., with respect to FIG. 3. The reference beam 706, however, is redirected to the second beam splitter 710 where it split into two different reference beams, each of which travels along a different path toward a corresponding mirror surface 712a, 712b. The mirrored surfaces (or surfaces angled to induce total internal reflection) 712a, 712b are tilted so that upon reflection, the reference beams travel back toward the second beam splitter 710 along different pathways from the incident reference beams. Each reflected reference beam then is recombined at the first beam splitter 702 with a corresponding measurement beam that has been diffracted from the measurement encoder scale. Each measurement-reference beam pair propagates toward a detector (or fiber ferrule). The angles at which the mirrored surfaces 712a, 712b are tilted are selected to ensure that each diffracted reference beams travels along the same direction and path as its corresponding measurement beam.

In the implementation shown in FIG. 7C, the arrangement of reference optical components includes a first quarter-wave polarizer 714, a birefringent wedge 716, a second quarter-wave polarizer 718 and a retro-reflector 720. Again, the first beam splitter 702 splits the input beam 703 into a measurement beam 704 and reference beam 706. The measurement beam 704 is directed toward an encoder scale associated with a measurement object as described herein, e.g., with respect to FIG. 3. The reference beam 706 propagates toward the polarizers 714, 718, the wedge 716 and the retro-reflector 720. The combination of polarizers and birefringent wedge gives rise to two different reference beams propagating at slightly different angles that are then redirected by the retro-reflector 720 back toward the beam splitter 702, where they each combine with a corresponding diffracted measurement beam and then travel toward a detector (or fiber ferrule). The angle of separation of the reference beams can be selected based on the chosen angle of the birefringent wedge prism 716.

In the implementation shown in FIG. 7D a beam splitting optical component 702 receives an input beam 703 from a light source module (e.g., a HeNe heterodyne laser source). The input beam 703 may be composed of both a measurement beam portion and a reference beam portion, each of which has a different polarization. The beam splitter 702 splits the input beam into a measurement beam and reference beam. The measurement beam 704 is directed toward an encoder scale associated with a measurement object as described, e.g., herein with respect to FIG. 5A. The reference beam 706, however, is redirected to a retro-reflector 722 and retro-reflected back to an reference scale 724 (e.g., a diffraction grating) where it is diffracted into multiple beams that travel back toward the beam splitter 702. The beam splitter 702 then combines each diffracted measurement beam with a corresponding diffracted measurement beam such that each measurement-reference beam pair propagates toward a detector (or fiber ferrule) with an angular separation (i.e., non-parallel). To ensure that each diffracted reference beams travels along the same direction and path as its corresponding measurement beam, the pitch of the grating marks on the reference scale 724 are spaced to achieve the desired angular separation.

In the implementation shown in FIG. 7E, a mirrored surface (or surface angled to induce total internal reflection) 726 and a wedge prism element 728 are used in place of the retro-reflector 722 and reference scale 724. In particular, the reference beam 706 is reflected off the mirrored surface 726 toward the wedge 728, where the wedge splits the incident reference beam into two separate beams propagating non-parallel to one another that are then reflected back toward the beam-splitter and combined with the diffracted measurement beams.

In the implementation shown in FIG. 7F, the reference beam is directed toward a retro-reflector 722, but instead of passing through a reference scale, the retro-reflected reference beam passes through a retarding or polarizing element 730 and a birefringent wedge prism pair 732 that splits the reference beam into two separate reference beams propagating non-parallel to one another.

In addition to the embodiments shown in FIGS. 7A-7F, it is also possible to duplicate the hardware defining the measurement leg of the interferometer in the reference leg (e.g., using the same components arranged in the same manner such as in the implementation shown in FIG. 6). An advantage of this approach is that the response of the optical components to environmental parameters, such as temperature, is balanced between the two legs, providing for a more robust solution that is resistant to errors caused by variations in the components response to environmental changes.

In some implementations, the angular separation between the output beams may be converted into a spatial separation, such as shown in the example described with respect to FIG. 3, in which the output beams pass through a focusing lens. The desired spatial separation between the beams then is established at a distance equivalent to the focal length of the lens. Each output beam then may be received by a corresponding detector module that records the intensity of the interfering beams and subsequently sends a signal to an electronic processor for analysis. Alternatively, the output beams may be coupled into separate fibers, each of which in turn leads to a separate detector configured to detect the intensity of the received beam. As explained herein, the separation distance D between the fibers and the selected focal length f of the lens determine the acceptable angular separation between the output beams.

In addition to a reduction in size requirements, the techniques disclosed herein also may, in certain implementations, enable a reduction in parasitic effects on the output beam. A general challenge in using diffractive elements in optical metrology is the fact that light is not only diffracted into the desired diffraction orders but also into undesired diffraction orders. The resulting light paths can contribute to the interference signal and thereby harm the measurement result. Moreover, the intensity of the desired output beam may be substantially reduced relative to the intensity of the original input beam, making the desired output beam more susceptible to such parasitic errors. For instance, a well-designed 2D diffraction grating will diffract about 20% of the light into each of the first diffraction orders and a few percent (e.g., 5%) into the zeroth diffraction order or higher diffraction orders.

More specifically, in encoder geometries with perfect retroreflectors, e.g., the desired output beam created by
First order diffraction of the input beam
Retroreflection, and
First order diffraction directing the beam towards the output may contain 4% of the initial input beam intensity (using the example diffraction efficiencies above and ignoring other losses).

In some implementations, one or more portions of the measurement beam component do not follow the measurement beam path and/or one or more portions of the reference beam component do not follow the reference beam path, leading to problematic parasitic/spurious beam paths. Consider an encoder system such as the configuration shown in FIG. 3 or FIG. 5 that includes a retroreflector (either a perfect retroreflector with a wedge or an imperfect retroreflector) for redirecting a once-diffracted measurement beam back towards an encoder scale. An example of a parasitic path in this system includes a beam that propagates according to the following sequence:
First order diffraction of the input measurement beam at the encoder scale
Retroreflection at the retroreflector
Second order diffraction at the encoder scale under the Littrow condition
Retroreflection at the retroreflector
Second order diffraction at the encoder scale under the Littrow condition
Retroreflection at the retroreflector
First order diffraction at the encoder scale that directs the diffracted beam toward the output (parallel to the desired final beam)

In the above example, the parasitic beam undergoes retroreflection twice more than intended due to the second order Littrow diffraction, before finally being redirected toward the beam combiner/splitter along a path that is parallel with the desired final beam. The foregoing example parasitic output measurement beam may contain 0.01% of the initial beam intensity. At that magnitude, the parasitic measurement beam can contribute greater than 1 nm of cyclic error for distance measurements along the grating surface normal. Previously, this type of error may have been mitigated using electronic cyclic error compensation such as that disclosed in U.S. Patent App. Pub. No. 2013/0278914, the subject matter of which is incorporated herein by reference in its entirety. Using the techniques described herein, however, the parasitic beam may accumulate an additional angular separation from the desired beam for each pass through the wedge or for each reflection by the imperfect retroreflector. As a result, the parasitic beam is separated at the output from the desired beams by an angle that is large enough so the parasitic beam does not contribute to the interference of the measurement beam.

Since the techniques described herein for introducing the angular deviation allow beams from multiple encoder channels to use the same footprint on the encoder scale, it is useful to pay attention to parasitic beams that cross over to the respective other retroreflector. For example, consider an encoder system that includes a first retroreflector (retroreflector 1) and a second retroreflector (retroreflector 2) arranged in a plane for redirecting once-diffracted measurement beams back to an encoder scale, such as the configurations shown in FIG. 3 or FIG. 5. A parasitic measurement beam originating in the foregoing configurations may propagate according to the following sequence:
First order diffraction of the input measurement beam at the encoder scale
Retroreflection (at retroreflector 1) back to the encoder scale
Specular reflection off the encoder scale at non-zero angle of incidence towards retroreflector 2
Retroreflection (at retroreflector 2) back to the encoder scale
Specular reflection off the encoder scale at non-zero angle of incidence
Retroreflection (at retroreflector 1) back to the encoder scale, and
First order diffraction that directs the parasitic beam toward the output.

For this parasitic beam to be angle-separated from the desired measurement beams so the parasitic beam does not contribute to the detected interference signal, the wedges or imperfect retroreflectors, whichever is used, can be chosen to alter the beam directions asymmetrically, i.e., not in opposite directions. That way, the unintended accumulation of three angle alterations cannot add up to the same angle as an intended single angle alteration. For example, the two wedges in FIG. 3 may be wedged by different amounts or they may have a wedge component oriented in another plane, such as along the Y-direction.

Another potential contributor to measurement errors in encoder systems is the presence of encoder scale errors. Encoder scale errors can be divided into holographic errors (e.g., a lateral deviation of one or more grating feature locations from a strictly periodic grid of locations) and substrate errors (e.g., form variations normal to the surface caused by variations in the substrate surface and/or by variations in the thickness of one or more layers formed on the substrate). The techniques disclosed herein can help reduce both types of encoder scale errors.

In systems where the lateral position of the encoder head with respect to the encoder scale is evaluated, system configurations similar to the one shown in FIG. 4A may be used, in which the two output channels utilize opposite diffraction orders. Assuming the lateral position is given by x, the phase outcomes $\varphi_1$ and $\varphi_2$ of the detected output beams may be combined to express x as $$x = g \frac{(\varphi_1 - \varphi_2)}{8\pi} \qquad (2)$$

where g is the grating pitch. Thus, the electronic processor may be configured to obtain and output a value for the lateral position by deriving the phase outcomes for each interference signal and applying equation (2).

Encoder head motion normal to the encoder scale (e.g., along the Z-direction as shown in FIG. 4A) changes the two phases in the same way so it does not affect the outcome. Substrate error, however, generally raises the surface area probed by the first channel (i.e., the first measurement beam) differently from the surface area probed by the second channel (i.e., the second measurement beam), which directly results in a measurement error. That is at least the case if the two beams probe separate areas on the encoder scale, such as in the configuration shown in FIG. 4A. If, on the other hand, the two beams probe substantially the same or identical area on the encoder scale (e.g., as in the configurations introducing an angular deviation between the measurement beams, such as shown in FIGS. 3 and 5, where the footprint of the diffracted measurement beams overlap), the measurement beams may generally probe the same substrate error, leading to two identical phase errors that subsequently cancel out in equation (2).

Similarly, a shared beam footprint may lead to substantially reduced sensitivity to holographic error when measuring normal to the surface of the encoder scale (along the Z-direction). For the determination of z displacement, the two channels' phases are combined in an additive manner, such that z displacement can be expressed as:

$$z = (\varphi_1 + \varphi_2) \frac{\lambda}{8\pi \left(1 + \sqrt{1 - \frac{\lambda^2}{g^2}}\right)} \quad (3)$$

where $\lambda$ is the light wavelength. In the case of a holographic error, where grating features are locally laterally shifted, the two phases $\varphi_1$ and $\varphi_2$ are shifted by the same amount but with opposite sign only if both beams probe the same area on the grating. By summation of the opposite phase shifts, the effect cancels out. The electronic processor therefore may be configured to obtain and output a value for the z displacement by deriving the phase outcomes for each interference signal and applying equation (3).

Another advantage of the techniques disclosed herein is that, in some implementations, the measurement beams and reference beams not only share components but also propagate through almost identical volumes of optical component material (e.g., glass) and air for much of their beam paths. As a result, lateral position measurements (again, using equation (2)) may be less sensitive to fluctuations or drifts caused for instance by air turbulence, optical components' adhesive lines moving due to humidity changes, or thermal effects including expansion and refractive index changes since each beam experiences approximately the same type and magnitude of effect.

The embodiments shown in FIGS. 5A and 6 utilize a 1D encoder scale. However, the same principle may be expanded for use with a 2D encoder scale. In the example of FIG. 5A, this entails supplying a second pair of imperfect retroreflectors arranged along a plane orthogonal to the first pair of imperfect retroreflectors (e.g., along the plane in which the input beam enters the reflector 502. In the example of FIG. 6, the monolithic optical component 602 may be modified to accept a second set of diffracted measurement (reference) beams that propagate along a plane orthogonal to the plane of propagation of the first set of diffracted measurement (reference) beams.

Figure 8:
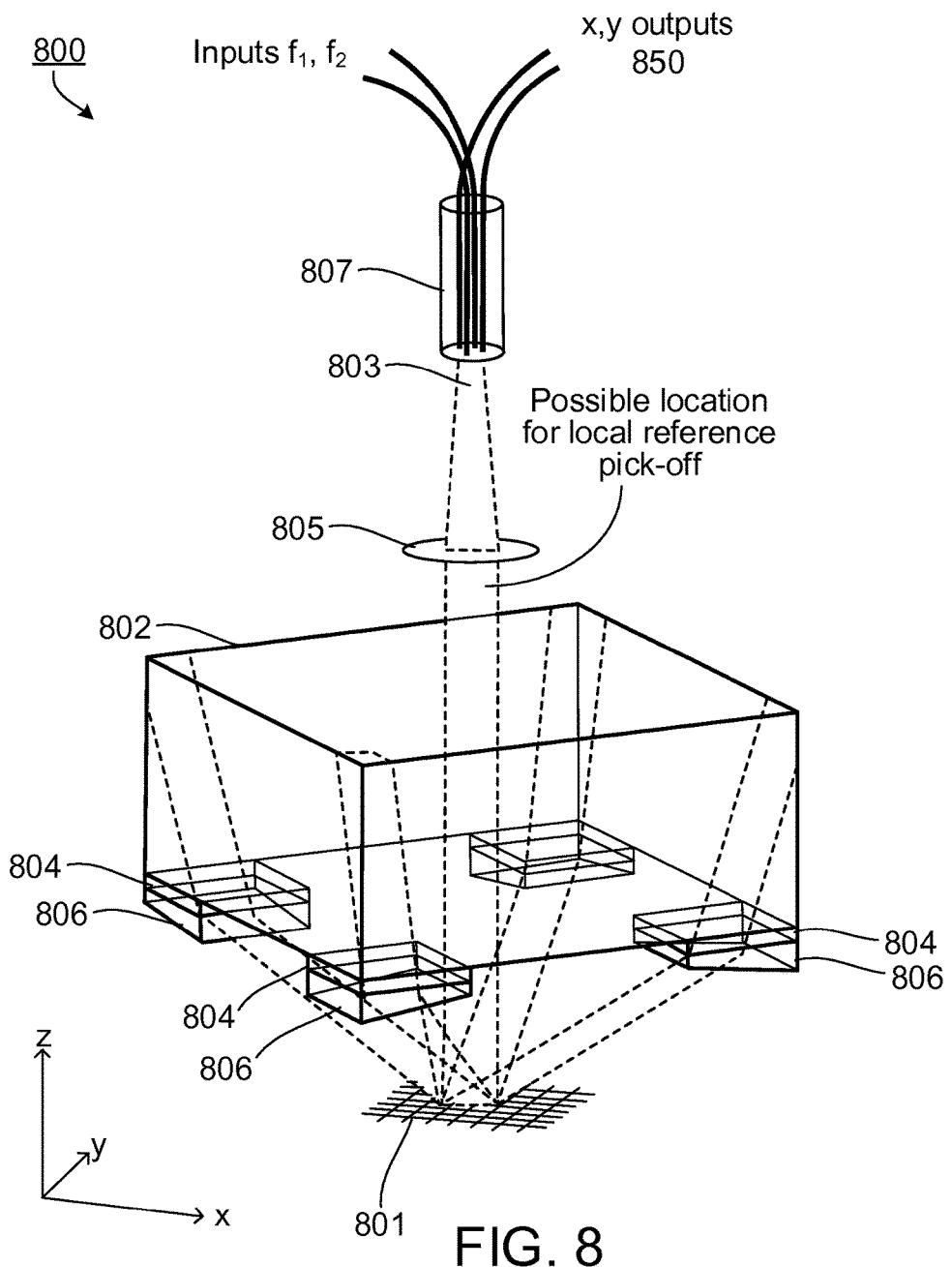
FIG. 8 is a schematic that illustrates an example of an encoder head having two output channels, each of which is arranged to detect interference between two beams that have been diffracted by an encoder scale.

In some embodiments, the encoder head does not include a reference leg having reference optical components. Instead, each output beam is composed of diffracted measurement beams that interfere at the detector. In some implementations, such configurations can enable a reduction in space requirements for the encoder head and/or can reduce costs as a result of fewer optical components. For instance, FIG. 8 is a schematic that illustrates example of an encoder head 800 having two output channels (x, y outputs 850), each of which is arranged to detect interference between two beams that have been diffracted by the encoder scale 801.

The example encoder head 800 includes an optical component 802, such as a cuboid (see, e.g., J. Liesener, "Compact encoder head for interferometric encoder system", U.S. Pat. No. 9,152,061, incorporated herein by reference in its entirety), four retarding or polarizing elements 804 (e.g., quarter waveplates) and four birefringent wedge elements 806, where each of the retarding or polarizing elements 804 and the wedge elements 806 is arranged at a different bottom corner of the component 802. In other implementations, the component 802 can be replaced with four different retro-reflectors, each of which has their apex arranged in the same position and orientation as a corresponding top corner of the cuboid shown in FIG. 8. In such implementations, the polarizers 804 and wedge elements 806 can remain in the same position as they are in the example shown in FIG. 8.

During operation of the encoder head 800, an input beam 803 from a light source (e.g., HeNe) is directed through a collimating lens 805 to the encoder scale 801 (e.g., a 2D grating). The input beam 803 may include a single beam or two separate beams having different frequencies $f_1$, $f_2$. The input beam(s) may be output from corresponding optical fibers held in a fiber ferrule 807. In the present example, the input beam(s) pass through the cuboid 802 prior to reaching the surface of the encoder scale 801. However, in implementations in which retroreflectors are used in place of the cuboid, the input beam(s) would not interact with the retro-reflectors before impinging on the encoder scale 801. The paths of the measurement beams are represented using dashed lines in FIG. 8.

Accordingly, multiple configurations are possible: (1) A homodyne configuration in which a single input beam having a single frequency is provided (e.g., through one single mode fiber) toward the encoder scale 801 and in which two output channels are available (e.g., the X and the Y channel) for measuring displacement in the x and y directions. The two output channels may be provided by two fibers (preferably multimode for simpler alignment) that lead to x, y outputs 850. (2) A heterodyne system with two input beams, each having a corresponding frequency $f_1$ and $f_2$. The two input beams may be supplied by two optical fibers as shown in FIG. 8 (preferably single mode fibers). The heterodyne system may also include two output channels (e.g., the X and the Y channel) for measuring displacement in the x and y directions. Again, the two output channels may be provided by two fibers (preferably multimode for simpler alignment) that lead to x, y outputs 850.

In both the heterodyne and homodyne configurations, the angles of the diffracted measurement beams are controlled/manipulated by directing them through the retarding or polarizing elements 804 and wedge elements 806. In the homodyne configuration, a single measurement beam is diffracted from the 2D encoder scale 801 into four diffraction orders. In the present example, each different diffracted measurement beam propagates with a vector component along the +x, −x, +y, or −y direction and thus are referred to as the +x, −x, +y, or −y diffraction orders. Each of the four once-diffracted beams propagates towards a corresponding polarizer/wedge prism pair and then is incident on the corner of the cuboid 802 (or apex of a retro-reflector) and redirected back through the polarizer/wedge pair to the encoder scale 801. After being diffracted a second time, the measurement beams then propagate back toward the X, Y output channels.

By letting the beams pass through birefringent wedges 806 and further polarizing elements 804, the angles of the diffracted beams are controlled in a way that, the twice-diffracted beams propagate at a particular angle for the +x and −x diffraction orders and at a different particular angle for the +y and −y diffraction orders. Beams propagating at the same angle (e.g. the +x and −x diffraction orders) interfere efficiently and can be directed to one detector (e.g., the X channel), whereas the beams propagating at another angle (the +y and −y diffraction orders) are directed to a different detector (e.g., the Y channel). Motion in the x and y directions then may be determined by evaluating the optical signal in the X and Y channels, respectively. Motion in the z direction is not determined with this embodiment. Indeed, in certain implementations, motion in the z direction does not affect the measurement outcomes in the x and y directions.

Figure 9:
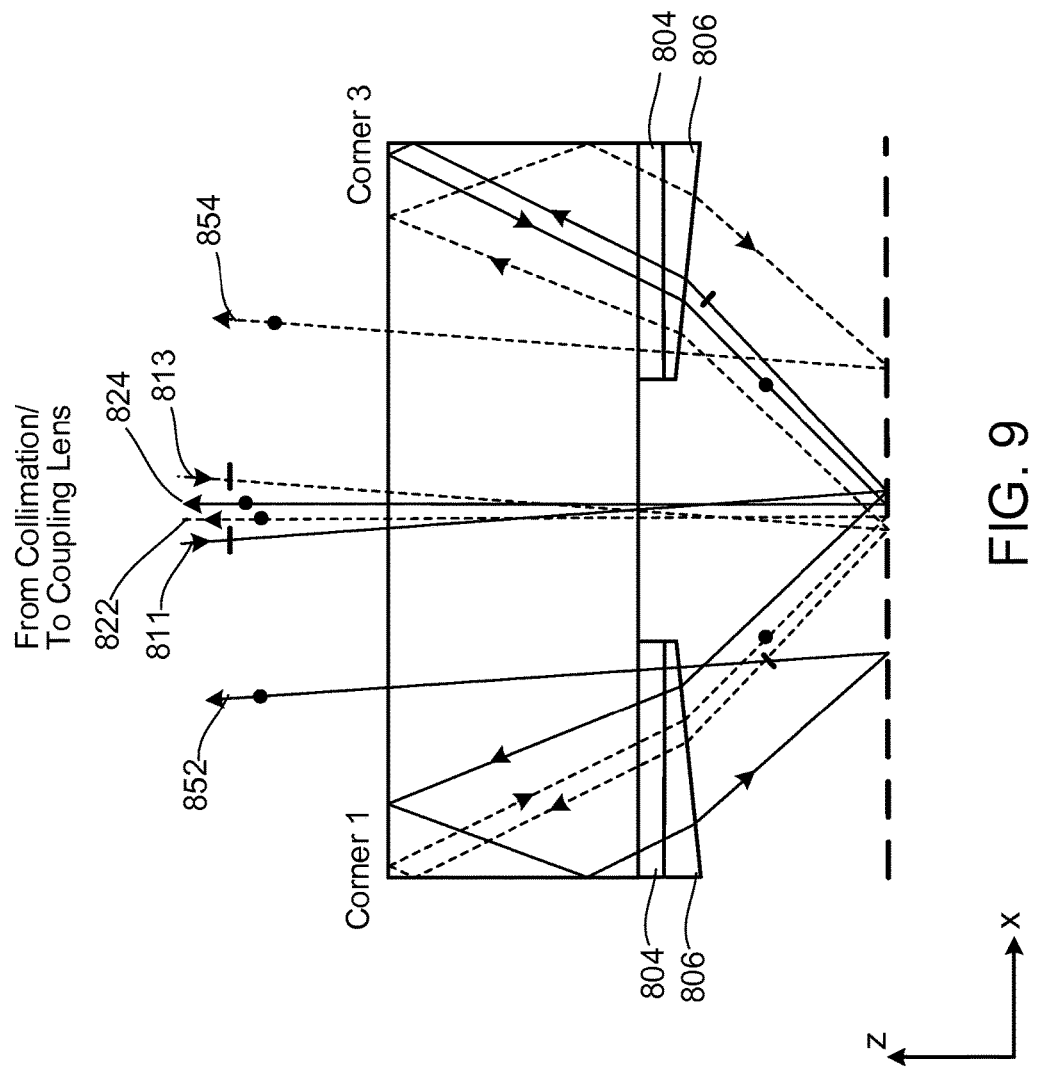
FIG. 9 is a schematic that illustrates a cross-sectional view of the encoder head arrangement shown in FIG. 8.

In the heterodyne configuration, the first input beam having the input frequency $f_1$ and the second input beam having the input frequency $f_2$, propagate from the input fibers toward the encoder scale 801 with slightly different angles. FIG. 9 is a schematic that illustrates a cross-sectional view of the encoder head arrangement shown in FIG. 8 through two opposite corners of the cuboid 802 along the x-axis. Because FIG. 9 illustrates a cross-section, only the beams propagating along the x-axis are shown. The two input beams 811, 813 are depicted using different dash lengths. The two input beams 811, 813 share the same linear polarization (chosen for the purposes of this example in the plane of this drawing). After the first diffraction off the encoder scale 801, both of the input beams 811, 813 create +x and −x diffraction orders. As a result, 2 once-diffracted measurement beams propagate along the −x direction towards the top left corner of the cuboid 802 in the illustration ("corner 1") and 2 once-diffracted measurement beams propagate along the +x-direction toward the top right corner of the cuboid 802 in the illustration ("corner 3"). At the corners, each once-diffracted measurement beam is retro-reflected back to the encoder scale 801, where the beams diffract a second time and then propagate towards the coupling lens. Again, the birefringent wedges 806 and a quarter wave plates 804 serve the same purpose as in the embodiment shown in FIG. 3, namely the manipulation of beam angles. In this embodiment, the angles are manipulated in a way that a twice diffracted $f_1$ beam 822, having a path through corner 1, ends up parallel to a twice diffracted $f_2$ beam 824, having a path through corner 3. Those two beams interfere and their common angle is chosen to let them couple into one of the output fibers. The remaining two beams 852, 854 have no parallel counterpart to interfere with. Furthermore, beams 852, 854 end up at angles that do not let them couple into any of the output fibers. Therefore, beams 852, 854 do not contribute to any optical signal at the detectors. Beams generated by the +y and −y diffraction orders, which are not shown in FIG. 9, retro-reflect at the other two corners of the cuboid 802. Again, only two of those beams end up parallel and are chosen to have an angle that lets them couple into the second output fiber.

In fiber-fed heterodyne configurations such as those shown in FIG. 8, optical phase fluctuations between the two input fibers due to environmental fluctuations may have to be compensated. For this purpose, a portion of the two input beams can be "picked off" after collimation but before interaction with the encoder scale and brought to interference. Obtaining phase information from the interfering input beams, the electronic processor then can compensate for the environmental fluctuations as explained herein. FIGS. 10A-10B are schematics that illustrate possible locations for such a so-called local reference interferometer relative to the collimator/coupling optics. The other optical components of the interferometer system and encoder scale are omitted for clarity.

In each configuration, versions of the local reference interferometer are shown for the case that the two input beams have the same linear polarization oriented diagonally. Other input beam polarizations may require different sets of retarding or polarizing elements. Each input beam is represented using different length dashed lines. In FIG. 10A, the local reference interferometer 1001 includes a beam splitter 1004, a pair of birefringent wedges 1006, a polarizer 1008 and a mirror 1010. The beam splitter picks off a portion of both input beams, which are traveling non-parallel relative to one another, after they have passed the collimator lens 1012. The two beams then propagate through the birefringent wedge pair 1006, the polarizer 1008, and reflect off the mirror 1010. The beams then pass through polarizer 1008 and birefringent wedge pair 1006 a second time. The beams are recombined at the beam-splitter 1004 so they are now parallel and are directed back to the collimator/coupling lens 1012 that couples the light into a fifth fiber (not shown) held, e.g., by the same ferrule that holds the input fibers and the other output fibers (see, e.g., FIG. 8). The input beam pair is passed from the fifth fiber to a corresponding detector, where an interference signal is generated. The electronic processor then extracts the phase information from the interference signal.

In FIG. 10B, the mirror of the local reference interferometer 1002 is omitted and replaced with a second beam splitter 1014. Because the mirror is omitted, the collimator lens 1012 cannot also serve as a coupling lens for coupling output light into the fibers. Instead, a separate coupling lens 1016 is provided. In this implementation, the non-parallel input beams again are picked off by the first beam splitter 1004 and pass through the birefringent wedge pair 1006 and polarizer 1008. In this example, the polarizer may also serve as polarization mixer that mixes the two orthogonally polarized beams created by the birefringent wedges. Upon reaching the second beam-splitter 1014, the input beams are recombined and propagate in parallel toward the coupling lens 1016. Again, the parallel input beam pair is coupled into a fifth fiber held, e.g., by the same ferrule that holds the input fibers and other output fibers (see, e.g., FIG. 8). The input beam pair is passed to a corresponding detector, where an interference signal is generated. The electronic processor then extracts the phase information from the interference signal. For cases where the two input beams have the same polarization (such as in the example of FIG. 9), configurations with gratings or with two separate mirrors are possible to parallelize the two beams.

The calculation of x and y displacements, as compensated using the phase information derived from the input beam pair interference signal, for the embodiment shown in FIG. 8 can be expressed as:

$$x = g\frac{(\varphi_1 - \varphi_{LR})}{8\pi} \qquad (4)$$

$$y = g\frac{(\varphi_2 - \varphi_{LR})}{8\pi} \qquad (5)$$

Here $\varphi_{LR}$ is the phase measured by the local reference interferometer described above.

Figure 11:
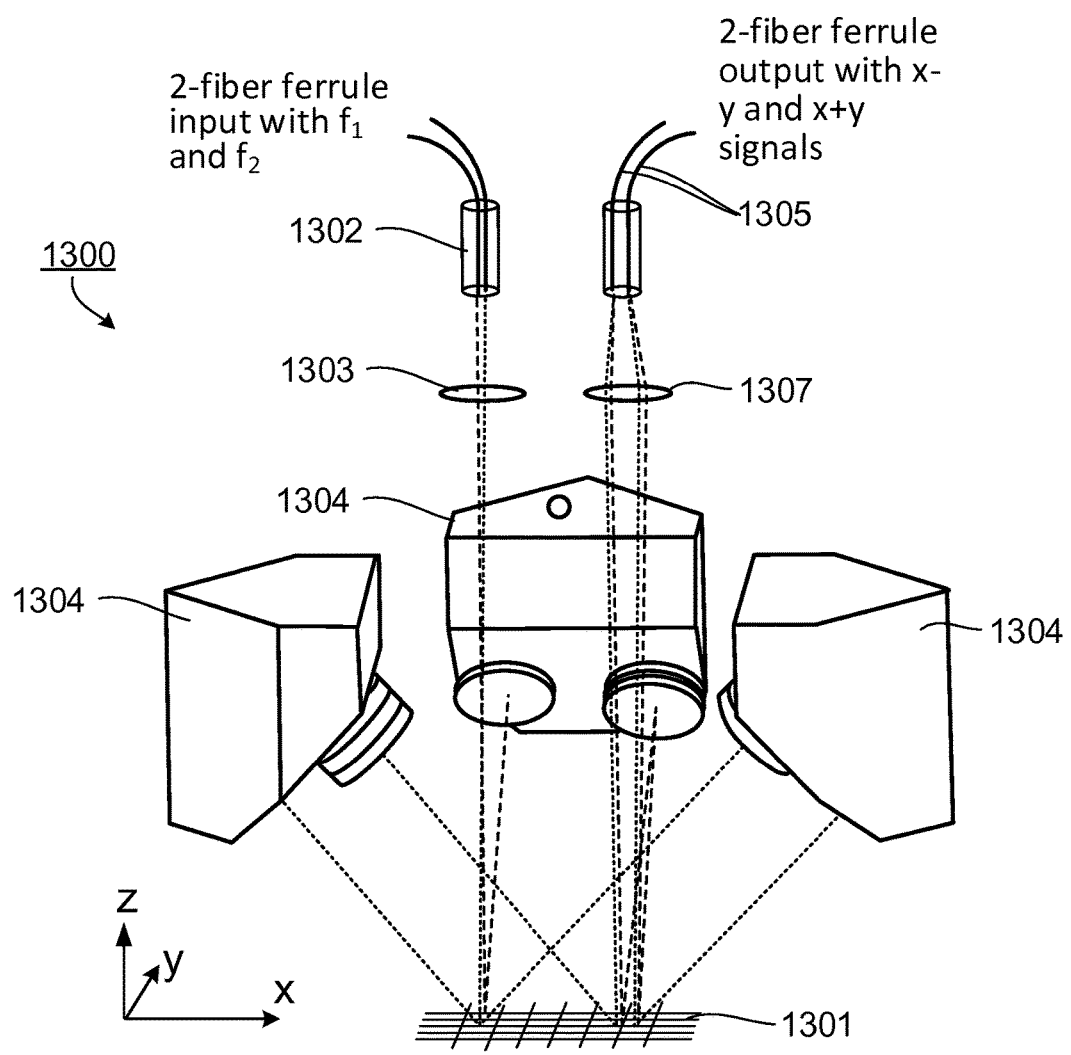
FIG. 11 is a schematic that illustrates an example of an encoder head.

In some embodiments, the encoder head utilizes three retro-reflecting elements or corners instead of four. For instance, FIG. 11 is a schematic that illustrates an example of an encoder head 1300 enables measurement of motion in the x and y directions using three retro-reflecting elements and based on interference between diffracted measurement beams. Such a configuration may be preferable in scenarios where space is limited for a fourth retro-reflector element. The encoder head 1300 is used in a heterodyne configuration, although other configurations are also possible. Within the heterodyne configuration, two input beams are provided from two separate fibers contained in an input fiber ferrule 1302. Each input beam has a corresponding optical frequency $f_1$ or $f_2$ and travels through the collimation lens 1303 towards the encoder scale 1301 at different angles. The output diffracted light beam pairs are couple into two output fibers 1305 by a separate coupling lens 1307. The output beam pairs carry the optical signals representing encoder scale motion along two orthogonal directions in the plane of the grating (not the z-direction).

Each retro-reflector 1304 of the encoder head 1300 can include or be arranged with optical components that modify polarization and the direction of the beams, e.g. waveplates, birefringent wedges or glass wedges at either the input or the output face. The two measurement channels can, e.g., be obtained as follows:

For the "X-Y" measurement channel, a portion of the $f_1$ input beam is diffracted in the +x direction (to the right of the page) and a portion of the $f_2$ beam is diffracted in the +y direction (into the page). The +x diffracted measurement beam and the +y diffracted measurement beam are retro-reflected by the right and the back retro-reflectors 1304, respectively, toward the encoder scale 1301, where the beams diffract a second time. As with other embodiments described herein (see, e.g., FIG. 3), the beams pass through the birefringent wedges and retarding or polarizing elements positioned between the retro-reflectors 1304 and the encoder scale 1301. The retarding or polarizing elements and birefringent wedge elements adjust the angles of the measurement beams, so that the diffracted measurement beams are parallel as they propagate towards the coupling lens 1307. The phase information that is derived from the interference between these diffracted beams enables the electronic processor to determine the difference between motions in the x and y directions.

For the "X+Y" measurement channel, a portion of the $f_1$ input beam is diffracted in the −x direction (to the left of the page) and a portion of the $f_1$ beam is diffracted in the +y direction (into the page). The beams are retro-reflected by the left and the back retro-reflectors 1304, respectively, toward the encoder scale 1301, where they are diffracted a second time. Again, as explained with respect to other embodiments, the retarding or polarizing elements and birefringent wedges adjust the angles of the diffracted beams, so that the foregoing beams (−x diffraction order and +y diffraction order) are parallel as they propagate toward the coupling lens 1307. The portion of the $f_2$ beam that is diffracted in the +y direction initially the same beam as used by the "X-Y" channel. However, a birefringent wedge attached to the back retroreflector 1304 (located in the center of the page) and an appropriate polarizing element splits the +y diffracted beam in two separate beams and thereby provides the required angular separation between the two channels. The phase information that is derived from the interference of the +y diffraction order and the −x diffraction order enables the electronic processor to determine the sum of motions in the x and y directions.

Figure 12:
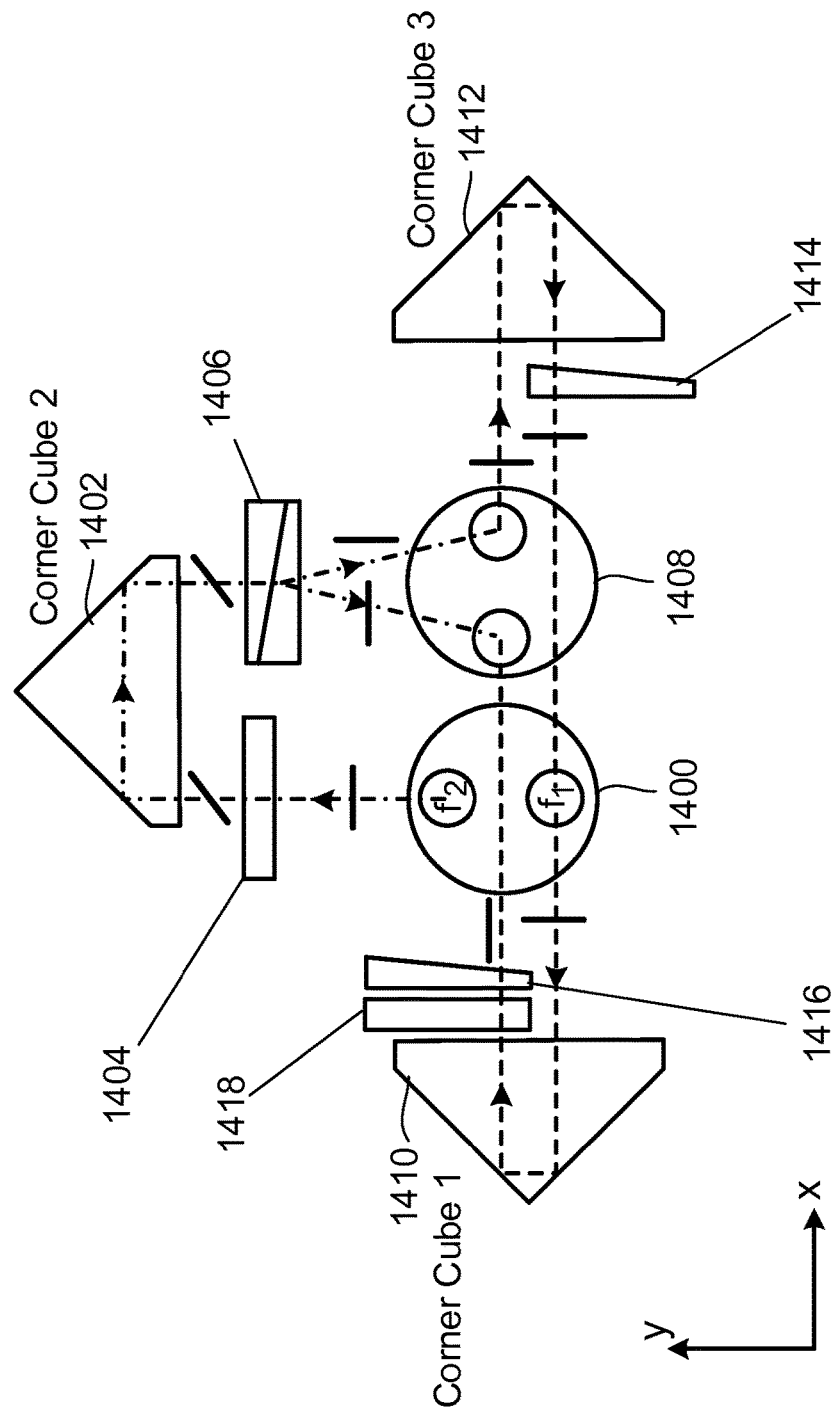
FIG. 12 is a schematic that illustrates a top view of the example encoder head of FIG. 11.

As explained above, birefringent wedge elements and polarizers are required to enable the correct diffraction orders to propagate in parallel and thus interfere. FIG. 12 is a schematic diagram that illustrates an example set of components suitable to manipulate the propagation angles of the diffracted beams in this way.

The diagram shown in FIG. 12 corresponds to a top down view of the system shown in FIG. 11 from the viewpoint of the fiber ferrules. The encoder scale and diffraction events are omitted for clarity. Additionally, the positions of the wedge and retarding or polarizing elements and beam paths may not be considered to be accurate representations of their actual position and orientation but are instead illustrated in a manner to facilitate the following description.

As shown in FIG. 12, a dual fiber ferrule 1400 in conjunction with the collimation lens provides two optical frequency inputs at $f_1$ and $f_2$ which are separated in angle and have mutually orthogonal polarizations. Only the relevant beam paths are explained in the following: The x-polarized input beam with frequency $f_2$ is diffracted by the grating (+y diffraction order) and directed toward corner cube 2 (1402), where the beam is retro-reflected back to the encoder scale. Prior to reaching the retro-reflector 1402, the polarization of the beam is rotated by 45° by use of a half wave plate 1404 in single transmission. After retro-reflection, but before reaching the encoder scale, a birefringent component (e.g. a double wedge) 1406 then splits the beam into two beams that have slightly different angles and mutually orthogonal polarizations. After the second diffraction event, one of those beams is now x-polarized, the other one y-polarized and the two angles are chosen to let the beams couple into two output fibers that are held by a common ferrule 1408. The other input beam with frequency $f_1$ and y-polarization diffracts into the −x and +x diffraction orders that are retro-reflected in corner cubes 1 (1410) and 3 (1412), respectively. Glass wedges 1414, 1416 in the two paths are used in single transmission to align the angles with the two other $f_2$ beams. Furthermore, the polarization of the beam going through corner cube 1 (1410) is rotated with a half wave plate 1418, so that its polarization after the second diffraction becomes the same x-polarization as that of the $f_2$ beam it is designed to interfere with. The other $f_1$ beam going though corner cube 3 (1412) already has the correct y-polarization, so no further polarizing element is required here.

The calculation of x and y displacements from the measured phases for the embodiment shown in FIG. 11 can be expressed as:

$$x = g\frac{((\varphi_1 - \varphi_{LR}) - (\varphi_2 - \varphi_{LR}))}{8\pi} = g\frac{(\varphi_2 - \varphi_2)}{8\pi} \qquad (6)$$

-continued $$y = g\frac{((\varphi_1 - \varphi_{LR}) + (\varphi_2 - \varphi_{LR}))}{8\pi} = g\frac{(\varphi_2 + \varphi_2 - 2\varphi_{LR})}{8\pi} \quad (7)$$

Note that the signs in equations 2 to 7 are dependent on sign convention in the actual implementation.

In summary, the techniques disclosed herein for introducing an angular deviation between measurement beams may include multiple advantages, such as a reduction in weight and space requirements for the interferometric encoder system because the number of optical components can be made smaller and/or shared between the multiple measurement beams. Such reduction may be achieved, for example, through using a fiber coupling assembly requiring a single lens to couple into multiple fibers, using a smaller beam splitter for separating and recombining measurement and reference beams due to volume shared among multiple beams, using a smaller encoder scale due to the smaller combined beam footprint. Cost savings also are possible for one or more of the same reasons that enable a reduction in system weight and size. Another potential advantage is that measurement errors arising from certain parasitic beam paths may be avoided. Additionally, the impact of substrate errors on lateral position measurements may be reduced or eliminated if footprints of the positive and negative channel measurement beams on the encoder scale substantially overlap. Moreover, the impact of holographic errors on position measurements normal to the surface may be reduced or eliminated if the footprints of the positive and negative channel measurement beams on the encoder scale are substantially the same or identical. In some implementations, there is also a reduction in drift for measurements that involve calculation of interference phase differentials between measurement channels (e.g., for detection of motion in the plane of the grating), due to common path characteristics.

In general, any of the analysis methods described above, including determining information about a degree of freedom of the encoder scales based on the detected interference signal, can be implemented in computer hardware or software, or a combination of both. For example, in some embodiments, the electronic processors can be installed in a computer and connected to one or more encoder systems and configured to perform analysis of signals from the encoder systems. Analysis can be implemented in computer programs using standard programming techniques following the methods described herein. Program code is applied to input data (e.g., interferometric phase information) to perform the functions described herein and generate output information (e.g., degree of freedom information). The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis methods can also be implemented as a computer-readable storage medium, configured with a computer program, where the storage medium so configured causes a computer to operate in a specific and predefined manner to perform the functions described herein.

Lithography Tool Applications

Lithography tools are especially useful in lithography applications used in fabricating large scale integrated circuits such as computer chips and the like. Lithography is the key technology driver for the semiconductor manufacturing industry. Overlay improvement is one of the five most difficult challenges down to and below 22 nm line widths (design rules), see, for example, the *International Technology Roadmap for Semiconductors*, pp. 58-59 (2009). See also M. S. Hibbs, "System overview of optical steppers and scanners," Microlithography, K. Suzuki, B. Smith, Eds., pp. 46-47 (CRC Press, Boca Raton, 2007).

Overlay depends directly on the performance, i.e., accuracy and precision, of the metrology system used to position the wafer and reticle (or mask) stages. Since a lithography tool may produce $50-100M/year of product, the economic value from improved metrology systems is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer. In certain lithography tools, e.g., lithography scanners, the mask is also positioned on a translatable stage that is moved in concert with the wafer during exposure.

Encoder systems, such as those discussed herein, may be important components of the positioning mechanisms that control the position of the wafer and reticle, and register the reticle image on the wafer. If such encoder systems include the features described herein, the accuracy of distances measured by the systems can be increased and/or maintained over longer periods without offline maintenance, resulting in higher throughput due to increased yields and less tool downtime. Moreover, using the encoder systems described herein may reduce overall costs through reduced material costs.

In general, the lithography tool, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Encoder systems described above can be used to precisely measure the positions of each of the wafer stage and mask stage relative to other components of the exposure system, such as the lens assembly, radiation source, or support structure. In such cases, the encoder system's optical assembly can be attached to a stationary structure and the encoder scale attached to a movable element such as one of the mask and wafer stages. Alternatively, the situation can be reversed, with the optical assembly attached to a movable object and the encoder scale attached to a stationary object.

More generally, such encoder systems can be used to measure the position of any one component of the exposure system relative to any other component of the exposure system, in which the optical assembly is attached to, or supported by, one of the components and the encoder scale is attached, or is supported by the other of the components.

Figure 13:
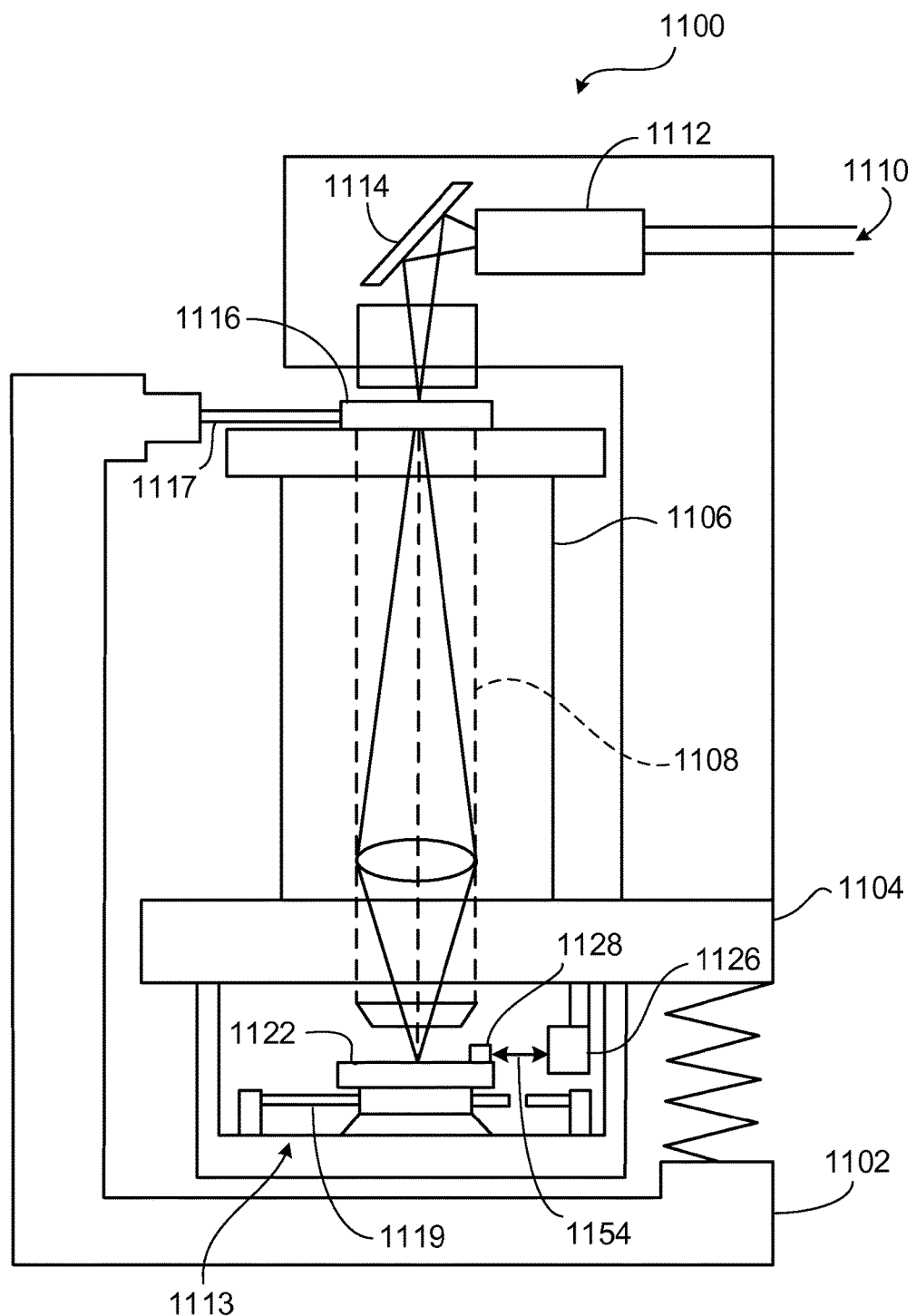
FIG. 13 is a schematic diagram of an embodiment of a lithography tool that includes an interferometer.

An example of a lithography tool 1100 using an interferometric encoder system 1126 is shown in FIG. 13. The interferometric encoder system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although it is not included in this described embodiment, one or more of the encoder systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1104 is a support base 1113 that carries wafer stage 1122. Stage 1122 includes a measurement object 1128 for diffracting a measurement beam 1154 directed to the stage by optical assembly 1126. A positioning system for positioning stage 1122 relative to optical assembly 1126 is indicated schematically by element 1119. Positioning system 1119 can include, e.g., piezoelectric transducer elements and corresponding control electronics. The measurement object diffracts the measurement beam back to the optical assembly, which is mounted on exposure base 1104. The interferometric encoder system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In some embodiments, one or more of the encoder systems described previously can be used to measure displacement along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In certain embodiments, the optical assembly 1126 can be positioned to measure changes in the position of reticle (or mask) stage 1116 or other movable components of the scanner system. Finally, the encoder systems can be used in a similar fashion with lithography systems involving steppers, in addition to, or rather than, scanners.

Figure 14A:
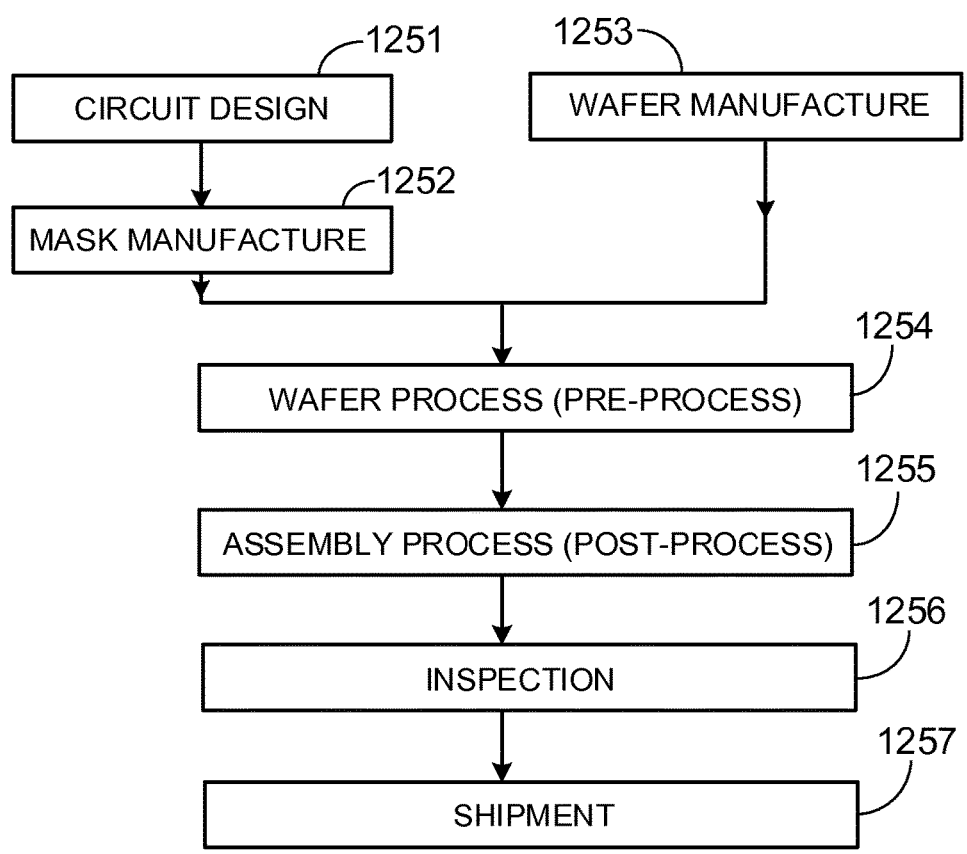
FIG. 14A and FIG. 14B are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 14A and 14B. FIG. 14A is a flow chart of the sequence of manufacturing a semiconductor device such as a semiconductor chip (e.g., IC or LSI), a liquid crystal panel or a CCD. Step 1251 is a design process for designing the circuit of a semiconductor device. Step 1252 is a process for manufacturing a mask on the basis of the circuit pattern design. Step 1253 is a process for manufacturing a wafer by using a material such as silicon.

Step 1254 is a wafer process that is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1255 is an assembling step, which is called a post-process wherein the wafer processed by step 1254 is formed into semiconductor chips. This step includes assembling (dicing and bonding) and packaging (chip sealing). Step 1256 is an inspection step wherein operability check, durability check and so on of the semiconductor devices produced by step 1255 are carried out. With these processes, semiconductor devices are finished and they are shipped (step 1257).

Figure 14B:
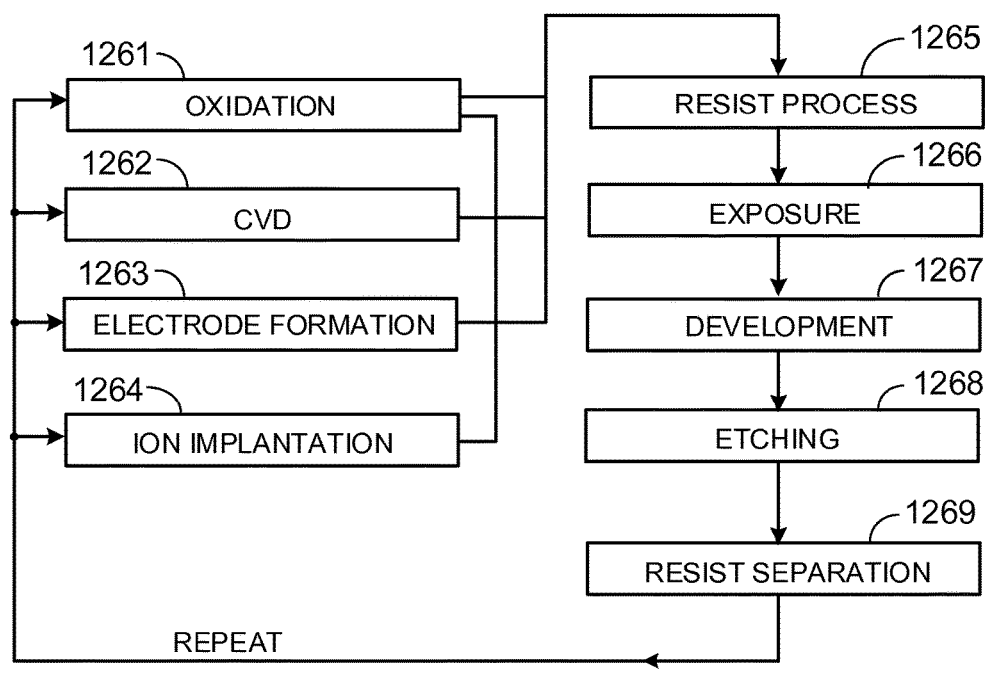

FIG. 14B is a flow chart showing details of the wafer process. Step 1261 is an oxidation process for oxidizing the surface of a wafer. Step 1262 is a CVD process for forming an insulating film on the wafer surface. Step 1263 is an electrode forming process for forming electrodes on the wafer by vapor deposition. Step 1264 is an ion implanting process for implanting ions to the wafer. Step 1265 is a resist process for applying a resist (photosensitive material) to the wafer. Step 1266 is an exposure process for printing, by exposure (i.e., lithography), the circuit pattern of the mask on the wafer through the exposure apparatus described above. Once again, as described above, the use of the encoder systems and methods described herein improve the accuracy and resolution of such lithography steps.

Step 1267 is a developing process for developing the exposed wafer. Step 1268 is an etching process for removing portions other than the developed resist image. Step 1269 is a resist separation process for separating the resist material remaining on the wafer after being subjected to the etching process. By repeating these processes, circuit patterns are formed and superimposed on the wafer.

The encoder systems described above can also be used in other applications in which the relative position of an object needs to be measured precisely. For example, in applications in which a write beam such as a laser, x-ray, ion, or electron beam, marks a pattern onto a substrate as either the substrate or beam moves, the encoder systems can be used to measure the relative movement between the substrate and write beam.

A number of embodiments have been described. Nevertheless, it will be understood that various modifications may be made without departing from the spirit and scope of the invention. Other embodiments are within the scope of the following claims.

What is claimed is:

1. An encoder interferometry system comprising:
    a plurality of optical components configured and arranged to receive and direct a measurement beam to an encoder scale to produce a plurality of twice-diffracted measurement beams such that, upon the second diffraction at the encoder scale, two of the plurality of twice-diffracted measurement beams are converging diffraction orders comprising at least partially overlapping beam paths with an angular separation $\alpha$;
    a first detector arranged to receive one of the two twice-diffracted measurement beams and a first reference beam;
    a second detector arranged to receive the other of the two twice-diffracted measurement beams and a second reference beam; and
    an electronic processor configured to receive an interference signal from each of the first and second detectors, each interference signal comprising a phase related to the relative displacement between the encoder scale and the encoder head, and to determine information about a degree of freedom of the encoder head or the encoder scale based on the phase for each interference signal.

2. The encoder interferometry system of claim 1, wherein the plurality of optical components comprises:
    a first retroreflector, a first waveplate, and a first birefringent wedge prism arranged to receive a first once-diffracted measurement beam from the encoder scale and redirect the first once diffracted measurement beam back to the encoder scale;
    a second retroreflector, a second waveplate, and a second birefringent wedge prism arranged to receive a second once-diffracted measurement beam from the encoder scale and redirect the second once diffracted measurement back to the encoder scale.

3. The encoder interferometry system of claim 1, wherein the plurality of optical components comprises:
    a first retroreflector and a first wedge prism, the first wedge prism being arranged to receive a single pass of a first once-diffracted measurement beam; and
    a second retroreflector and a second wedge prism, the second wedge prism being arranged to receive a single pass of a second once-diffracted measurement beam.

4. The encoder interferometry system of claim 1, further comprising:
    a focusing lens positioned to receive the first twice-diffracted measurement beam and the second twice-diffracted measurement beam; and
    an arrangement comprising a first optical fiber and a second optical fiber, the first optical fiber being positioned to receive one of the two twice-diffracted measurement beams and the first reference beam, and the second optical fiber being positioned to receive the other of the two twice-diffracted measurement beams and the second reference beam, wherein an entrance face of the first optical fiber is separated from an entrance face of the second optical fiber by a distance D, wherein $D=(\alpha)(f)$, and f is a focal length of the focusing lens.

5. The encoder interferometry system of claim 1, wherein the plurality of optical components are configured and arranged to:
    receive a first once-diffracted measurement beam from the encoder scale;
    receive a second once-diffracted measurement beam from the encoder scale; and
    redirect the first and second once-diffracted measurement beams to substantially the same area on the encoder scale.

6. The encoder interferometry system of claim 1, wherein the first once-diffracted measurement beam comprises a positive first order diffracted beam and the second once-diffracted measurement beam comprises a negative first order diffracted beam.

7. The encoder interferometry system of claim 1, wherein the plurality of optical components comprises:
    a first reflector element having at least two reflecting facets arranged to receive redirect a first once-diffracted measurement beam to the encoder scale, wherein an angle between the at least two reflecting facets of the first reflector is greater than or less than 90 degrees,
    a second reflector element having at least two reflecting facets arranged to receive and redirect a second once-diffracted measurement beam to the encoder scale, wherein an angle between the at least two reflecting facets of the second reflector is greater than or less than 90 degrees.

8. The encoder interferometry system of claim 1, further comprising:
    the encoder scale; and
    a moveable stage, wherein the encoder scale or the encoder head is attached to the moveable stage.

9. The encoder interferometry system of claim 1, wherein the plurality of optical components comprises a beam splitting element configured and arranged to:
    receive the first reference beam and the second reference beam; and
    combine the first reference beam and the second reference beam with the one of the two twice-diffracted measurement beam and the other of the two twice-diffracted measurement beam to form a first output beam and a second output beam, respectively.

10. The encoder interferometry system of claim 1, wherein the plurality of optical components are further configured and arranged to direct a second beam to the encoder scale to produce a plurality of twice-diffracted second beams, the twice-diffracted second beams comprising the first reference beam and the second reference beam, wherein the first reference beam and the second reference beam propagate along non-parallel beam paths having the angular separation α, and the non-parallel beam paths of the first reference beam and the second reference beam at least partially overlap.

11. The encoder interferometry system of claim 1, wherein the plurality of optical components comprises a plurality of reference optical components, the reference optical components being configured and arranged to:
 receive a second beam;
 produce, from the second beam, the first reference beam and the second reference beam, wherein the first reference beam and the second reference beam propagate along non-parallel beam paths having the angular separation α.

12. The encoder interferometry system of claim 11, wherein the plurality of reference optical components comprises a diffraction grating.

13. The encoder interferometry system of claim 11, wherein the plurality of reference optical components comprises:
 a beam-splitting component, a first reflecting surface and a second reflecting surface, wherein the beam splitting component is arranged to split the second beam into the first reference beam and the second reference beam, to direct the first reference beam to the first reflecting surface, to direct the second reference beam to the second reflecting surface, and to receive and combine the first and second reference beams after reflection from the first and second reflecting surfaces, respectively,
 wherein a plane of the first reflecting surface facing a first side of the beam splitting component is non-parallel with the first side of the beam splitting component, and a plane of the second reflecting surface facing a second side of the beam splitting component is non-parallel with the second side of the beam splitting component.

14. The encoder interferometry system of claim 11, wherein the plurality of reference optical components comprises a first quarter-wave polarizer arranged to receive the second beam, a second quarter-wave polarizer, a birefringent wedge component between the first and second quarter-wave polarizers, and a retro-reflector arranged to:
 receive the first reference beam and the second reference beam from the second quarter-wave polarizer; and
 redirect the first reference beam and the second reference beam to the second quarter-wave polarizer.

15. The encoder interferometry system of claim 11, wherein the plurality of reference optical components comprises:
 a retro-reflector; and
 a diffraction grating, wherein the retro-reflector is arranged to receive the second beam and redirect the second beam to the diffraction grating, and wherein the diffraction grating is arranged to produce the first and second reference beams from the second beam received from the retro-reflector.

16. The encoder interferometry system of claim 11, wherein the plurality of reference optical components comprises a reflecting surface and wedge prism, wherein the reflecting surface is arranged to receive the second beam and redirect the second beam to the wedge prism, and wherein the wedge prism is arranged to receive the second beam from the reflecting surface to produce the first and second reference beams.

17. The encoder interferometry system of claim 11, wherein the plurality of reference optical components comprises:
 a retro-reflector arranged to receive and redirect the second beam;
 a polarizing element arranged to receive the redirected second beam from the retro-reflector; and
 a birefringent wedge prism pair arranged to receive the second beam from the polarizing element and to produce the first and second reference beams.

18. An encoder interferometry system comprising:
 an encoder head, the encoder head being configured to direct light to an encoder scale to produce a plurality of twice-diffracted measurement beams,
 wherein the encoder head comprises
 a single optical element arranged to receive an input beam from a light source, wherein the optical element is configured to direct a first portion of the input beam along a measurement path to define a measurement beam,
 wherein, the optical element is further configured and arranged to receive a first once-diffracted measurement beam and a second once-diffracted measurement beam from the encoder scale and to redirect the first once-diffracted measurement beam and the second once-diffracted measurement beam toward the encoder scale to produce a first twice-diffracted measurement beam and a second twice-diffracted measurement beam such that, upon the second diffraction at the encoder scale, the first twice-diffracted measurement beam and the second twice-diffracted measurement beam are converging diffraction orders comprising at least partially overlapping beam paths with an angular separation α through the optical element;
 a first detector arranged to receive the first twice-diffracted measurement beam and a first reference beam;
 a second detector arranged to receive the second twice-diffracted measurement beam and a second reference beam; and
 an electronic processor configured to receive an interference signal from each of the first and second detectors, each interference signal comprising a phase related to the relative displacement between the encoder scale and the encoder head, and to determine information about a degree of freedom of the encoder head or the encoder scale based on the phase for each interference signal.

19. The encoder interferometry system of claim 18, wherein the single optical element comprises:
 at least two reflecting facets arranged to redirect the first once-diffracted measurement beam, wherein an angle between the at least two reflecting facets that are arranged to redirect the first once-diffracted measurement beam is greater than or less than 90 degrees; and
 at least two reflecting facets arranged to redirect the second once-diffracted measurement beam toward the encoder scale, wherein an angle between the at least two reflecting facets that are arranged to redirect the second once-diffracted measurement beam toward the encoder scale is greater than or less than 90 degrees.

20. The encoder interferometry system of claim 18, further comprising:

a focusing lens positioned to receive the first twice-diffracted measurement beam and the second twice-diffracted measurement beam from the single optical element; and an arrangement comprising a first optical fiber and a second optical fiber, the arrangement being positioned to receive the first twice-diffracted measurement beam and the second twice-diffracted measurement beam, wherein an entrance face of the first optical fiber is separated from an entrance face of the second optical fiber by distance D, wherein $D=(\alpha)(f)$, and f is a focal length of the focusing lens.

21. The encoder interferometry system of claim 18, wherein the single optical element is configured and arranged to redirect the first once-diffracted measurement beam and the second once-diffracted measurement beam to substantially the same area on the encoder scale.

22. The encoder interferometry system of claim 18, wherein the first once-diffracted measurement beam comprises a positive first order diffracted beam and the second once-diffracted measurement beam comprises a negative first order diffracted beam.

23. The encoder interferometry system of claim 18, further comprising:
the encoder scale; and
a moveable stage, wherein the encoder scale or the encoder head is attached to the moveable stage.

24. A lithography system comprising:
the encoder interferometry system of claim 1 or claim 18;
the encoder scale;
a moveable stage, wherein either the encoder system or the encoder scale is attached to the moveable stage;
an illumination system including a radiation source, wherein during operation of the lithography system, the radiation source directs radiation to an object supported by the moveable stage; and
a positioning system coupled to the electronic processor of the encoder interferometry system and configured to adjust a position of the stage based on the information about the degree of freedom.

25. A method comprising:
directing, from an encoder head, a portion of an input beam to an encoder scale, wherein the portion of the input beam is diffracted by the encoder scale into a first once-diffracted measurement beam and a second once-diffracted measurement beam;
receiving at the encoder head the first once-diffracted measurement beam and the second once-diffracted measurement beam following diffraction from the encoder scale;
redirecting, from the encoder head, the first once-diffracted measurement beam and the second once-diffracted measurement beam back toward the encoder scale to produce a first twice-diffracted measurement beam and a second twice-diffracted measurement beam such that, as a result of the redirection and second diffraction, the first twice-diffracted measurement beam and the second twice-diffracted measurement beam are converging diffraction orders comprising at least partially overlapping beam paths with an angular separation $\alpha$;
receiving, at a first detector, a first output beam comprising the first twice-diffracted measurement beam and a first reference beam to produce a first interference signal;
receiving, at a second detector, a second output beam comprising the second twice-diffracted measurement beam and a second reference beam to produce a second interference signal, wherein each interference signal comprises a phase related to the relative displacement between the encoder scale and the encoder head;
receiving, at an electronic processor, the first and second interference signals; and
determining, by the electronic processor, information about a degree of freedom of the encoder scale or the encoder head based on the phase for each interference signal.

26. The method of claim 25, further comprising:
passing the first output beam and the second output beam through a lens of focal length f;
receiving, from the lens, the first output beam and the second output beam at an arrangement comprising a first optical fiber and a second optical fiber, wherein a spatial separation D of the first output beam at an entrance face of the first optical fiber from the second output beam at entrance face of the second optical fiber is defined as $D=(\alpha)(f)$; and
passing the first output beam and the second output beam from the first optical fiber and the second optical fiber to the first detector and the second detector, respectively.

27. The method of claim 25, wherein redirecting the first once-diffracted measurement beam and the second once-diffracted measurement beam back to the encoder scale comprises redirecting the first once-diffracted measurement beam and the second once-diffracted measurement beam to substantially the same area on the encoder scale.

28. The method of claim 25, wherein redirecting the first once-diffracted measurement beam and the second once-diffracted measurement beam back to the encoder scale comprises:
passing the first once-diffracted measurement beam through a first waveplate and a first birefringent wedge prism to a first retroreflector;
redirecting the first once-diffracted measurement beam back through the first waveplate and the first birefringent wedge prism;
passing the second once-diffracted measurement beam through a second waveplate and a second birefringent wedge prism to a second retroreflector; and
redirecting the second once-diffracted measurement beam back through the second waveplate and the second birefringent wedge prism.

29. The method of claim 25, wherein redirecting the first once-diffracted measurement beam and the second once-diffracted measurement beam back to the encoder scale comprises:
passing the first once-diffracted measurement beam to a first retroreflector;
passing the first once-diffracted measurement beam through a first wedge prism once either before or after the first once-diffracted measurement beam reaches the first retroreflector;
passing the second once-diffracted measurement beam through a second retroreflector; and
passing the second once-diffracted measurement beam through a second wedge prism once either before or after the second diffracted measurement beam reaches the second retroreflector.

30. The method of claim 25, wherein redirecting the first once-diffracted measurement beam and the second once-diffracted measurement beam back to the encoder scale comprises:

passing the first once-diffracted measurement beam to a first corner cube reflector comprising three reflecting facets, wherein an angle between at least two of the adjacent reflecting facets of the first corner cube reflector is greater than or less than 90 degrees; and passing the second once-diffracted measurement beam to a second corner cube reflector comprising three reflecting facets, wherein an angle between at least two of the adjacent reflecting facets of the second corner cube reflector is greater than or less than 90 degrees.

31. The method of claim 25, wherein the encoder head comprises a monolithic optical element having a plurality of reflecting facets, and wherein an angle between adjacent reflecting facets of the monolithic optical element is greater than or less than 90 degrees.

32. The method of claim 25, wherein the first once-diffracted measurement beam comprises a positive first order diffracted beam and the second once-diffracted measurement beam comprises a negative first order diffracted beam.

33. An encoder interferometry system comprising:
an encoder head comprising:
a plurality of optical elements arranged and configured to direct a first measurement beam and a second measurement beam toward an encoder scale to produce a first once-diffracted measurement beam and a second once-diffracted measurement beam,
receive the first once-diffracted measurement beam and the second once-diffracted measurement beam from the encoder scale,
redirect the first once-diffracted measurement beam and the second once-diffracted measurement beam toward the encoder scale to produce a first twice-diffracted measurement beam and a second twice-diffracted measurement beam such that, as a result of the redirection and second diffraction at the encoder scale, the first twice-diffracted measurement beam and the second twice-diffracted measurement beam are converging diffraction orders comprising at least partially overlapping beam paths with an angular separation α following the second diffraction at the encoder scale, and
combine the first twice-diffracted measurement beam and the second twice-diffracted measurement beam with a third beam and a fourth beam, respectively, wherein the third beam and the fourth beam have the same angular separation α such that the first twice-diffracted measurement beam and the third beam propagate along a first co-linear path and so that the second twice-diffracted measurement beam and the fourth beam propagate along a second co-linear path;
a first detector arranged to receive the first twice-diffracted measurement beam and the third beam;
a second detector arranged to receive the second twice-diffracted measurement beam and the fourth beam; and
an electronic processor configured to receive an interference signal from each of the first and second detectors, each interference signal comprising a phase related to the relative displacement between the encoder scale and the encoder head, and to determine information about a degree of freedom of the encoder head or the encoder scale based on the phase for each interference signal.

34. The encoder interferometry system of claim 33, wherein the plurality of optical components comprises:
at least one retro-reflector element;
at least one waveplate;
at least one optical wedge element, wherein at least one of the waveplates and at least one of the optical wedge elements are arranged in a corresponding waveplate-wedge pair that is positioned in a beam path of the first once-diffracted measurement beam.

35. The encoder interferometry system of claim 34, comprising two retro-reflector elements and a second waveplate-wedge pair, wherein
the first retro-reflector element is positioned to receive the first once-diffracted measurement beam from the first waveplate-wedge pair and/or redirect the first once-diffracted measurement beam to the first waveplate-wedge pair, and
the second retro-reflector element is positioned to receive the second once-diffracted measurement beam from the second waveplate-wedge pair and/or redirect the second once-diffracted measurement beam to the second waveplate-wedge pair.

36. The encoder interferometry system of claim 34, comprising a single retro-reflector element and at least two waveplate-wedge pairs, wherein the single retro-reflector element is a cuboid shaped optical element having a plurality of retro-reflecting corners, and wherein the cuboid shaped optical element is positioned to:
receive, from the first waveplate-wedge pair, the first once-diffracted measurement beam at a first retro-reflecting corner,
redirect the first once-diffracted measurement beam back to the first waveplate-wedge pair,
receive, from the second waveplate-wedge pair, the second once-diffracted measurement beam at a second retro-reflecting corner, and
redirect the second once-diffracted measurement beam back to the second waveplate-wedge pair.

37. The encoder interferometry system of claim 34, further comprising the encoder scale.

38. The encoder interferometry system of claim 34, comprising:
three retro-reflector elements;
two non-birefringent wedge elements;
a birefringent wedge element; and
two waveplates, wherein a first non-birefringent wedge element is positioned at an input or output face of a first retro-reflector element, a second non-birefringent wedge element and a first waveplate are positioned at an input or output face of a second retro-reflector element, and the birefringent wedge element and a second waveplate are positioned at an input or output face of a third retro-reflector element, wherein the first and the second retro-reflector elements are arranged across from one another such that the first and second retro-reflector elements receive, from the encoder scale, the first once-diffracted measurement beam and the second once-diffracted measurement beam, respectively, a beam path of the first once-diffracted measurement beam and a beam path of the second once-diffracted measurement beam are in the same first plane, and
wherein the third retro-reflector element is arranged to receive, from the encoder scale, a third once-diffracted measurement beam that propagates along a beam path that is in a second plane oriented orthogonal to the first plane, the birefringent wedge element and a second waveplate being arranged to split the third once-diffracted measurement beam into two separate beams that, following diffraction from the encoder scale, correspond to the third and fourth beam.

\* \* \* \* \*